(12) United States Patent
Crane et al.

(10) Patent No.: US 9,048,691 B2
(45) Date of Patent: Jun. 2, 2015

(54) CONVERTERS

(71) Applicant: GE ENERGY POWER CONVERSION TECHNOLOGY LIMITED, Warwickshire (GB)

(72) Inventors: Allan David Crane, Rugby Warwickshire (GB); Warren Mark Blewitt, Rugby Warwickshire (GB)

(73) Assignee: GE ENERGY POWER CONVERSION TECHNOLOGY LTD. (GB)

( * ) Notice: Subject to any disclaimer, the term of this patent is extended or adjusted under 35 U.S.C. 154(b) by 0 days.

(21) Appl. No.: 14/193,120

(22) Filed: Feb. 28, 2014

(65) Prior Publication Data

US 2014/0247629 A1    Sep. 4, 2014

(30) Foreign Application Priority Data

Mar. 1, 2013  (EP) .................................... 13157461

(51) Int. Cl.
*H02J 3/36* (2006.01)
*H02M 1/08* (2006.01)
*H02M 7/515* (2007.01)
*H02M 7/521* (2006.01)

(52) U.S. Cl.
CPC .. *H02J 3/36* (2013.01); *H02M 1/08* (2013.01); *H02M 7/5152* (2013.01); *H02M 7/521* (2013.01)

(58) Field of Classification Search
CPC ........ H02J 3/36; H02H 7/125; H02M 7/7575; H02M 7/5387; H02M 1/32; H02M 1/34; H02M 5/4585; H02M 5/458

USPC .......... 363/35, 37, 58, 56.02, 56.05, 132, 137
See application file for complete search history.

(56) References Cited

U.S. PATENT DOCUMENTS

| | | | | |
|---|---|---|---|---|
| 4,210,956 A * | 7/1980 | Watanabe | ........................ | 363/51 |
| 4,549,259 A | 10/1985 | Ueda et al. | | |
| 4,656,571 A * | 4/1987 | Umezu | ............... | 363/37 |
| 5,057,987 A * | 10/1991 | Kumar et al. | ................... | 363/58 |
| 6,519,169 B1 * | 2/2003 | Asplund et al. | ............... | 363/132 |
| 6,898,095 B2 * | 5/2005 | Bijlenga et al. | ............... | 363/132 |
| 7,916,507 B2 * | 3/2011 | Birnbach | ........................ | 363/31 |
| 7,990,097 B2 * | 8/2011 | Cheng et al. | ................... | 318/800 |
| 8,212,408 B2 * | 7/2012 | Fishman | ........................ | 307/77 |

(Continued)

FOREIGN PATENT DOCUMENTS

| | | |
|---|---|---|
| DE | 4447406 C1 | 6/1996 |
| EP | 0218983 A1 | 4/1987 |

OTHER PUBLICATIONS

European Search Report from corresponding European Patent Application No. 13157461.8, dated Jan. 3, 2014.

*Primary Examiner* — Adolf Berhane
(74) *Attorney, Agent, or Firm* — GE Global Patent Operation; Catherine J. Toppin

(57) ABSTRACT

A converter, and in particular a current source converter, including a bridge having an AC terminal for each of one or more AC lines, and first and second DC terminals. A converter arm is connected between each respective AC terminal and the first DC terminal, and between each respective AC terminal and the second DC terminal. Each converter arm includes a first power semiconductor switching device capable of being turned 'on' and 'off' by gate control and having a recovery time. The converter is adapted to be operated in one or more inverting modes.

20 Claims, 6 Drawing Sheets

(56) References Cited

U.S. PATENT DOCUMENTS

| | | | |
|---|---|---|---|
| 8,223,511 B2* | 7/2012 | Cheng et al. | 363/35 |
| 8,345,457 B2* | 1/2013 | Asplund et al. | 363/132 |
| 8,476,854 B2* | 7/2013 | Blocher et al. | 318/400.3 |
| 8,570,775 B2* | 10/2013 | Wei et al. | 363/39 |
| 8,766,480 B2* | 7/2014 | Hiller et al. | 307/82 |
| 8,848,403 B2* | 9/2014 | Hasler | 363/39 |
| 8,942,014 B2* | 1/2015 | Norrga et al. | 363/68 |
| 2008/0310205 A1* | 12/2008 | Hiller | 363/131 |
| 2013/0193766 A1* | 8/2013 | Irwin et al. | 307/82 |
| 2014/0146582 A1* | 5/2014 | Gupta et al. | 363/35 |
| 2014/0268926 A1* | 9/2014 | Gupta et al. | 363/35 |

* cited by examiner

CONVERTERS

TECHNICAL FIELD

Embodiments of the present invention relate to converters, and in particular to current source converters (CSCs) for use inter alia in high voltage direct current (HVDC) point-to-point transmission links and HVDC multi-terminal grids where maximum power conversion efficiency and availability are required.

BACKGROUND ART

Line commutated converters (LCC) are a type of current source converter (CSC) and can be employed in high voltage direct current (HVDC) transmission links between high voltage alternating current (HVAC) power networks or grids. LCCs employ naturally commutated thyristor bridges in rectifying (power transmitting) and inverting (power receiving) terminals. Power flow through such HVDC transmission links may be reversible whilst HVDC transmission current is unipolar. HVDC transmission link voltage must also be reversible and this can be achieved using the well known principle of phase control. The requirement for a reversible HVDC transmission link voltage imposes severe limitations upon the choice of HVDC cable insulation and this renders the use of near ideal elastomeric cable insulation systems impossible. The requirement for a reversible HVDC transmission link voltage also imposes severe limitations upon the potential adoption of multi-terminal HVDC grid networks, which are only fully effective in permitting reversible power flow at all terminals when a unipolar HVDC transmission link voltage is employed.

Naturally commutated thyristor bridges are the most efficient and reliable means of AC to DC and DC to AC power conversion, but this advantage is to a significant degree opposed by a requirement to correct the HVAC grid terminal power factor and harmonic distortion that is caused by the use of the principle of phase control. Phase control is used to regulate the power flow through the HVDC transmission link whilst respective HVAC grid voltages vary and, historically, very large switched passive filters and power factor correction networks have been used to compensate for the HVAC grid terminal power factor and harmonic distortion that is caused by the use of phase control. More recently, static compensators have been employed to simplify and reduce the need for switched compensation systems. The requirement to compensate harmonic distortion and power factor is exacerbated as the ranges of respective HVAC grid voltages and associated ranges of phase control are increased. Safe inverting LCC commutation cannot be achieved during severe HVAC grid voltage dips since the required range of phase control is inconsistent with the requirements for thyristor commutation and, for the same reason, inverting LCCs cannot energise an HVAC grid system that has become de-energised. Despite the above disadvantages, the power transmission efficiency of LCCs is such that they are typically the preferred solution for high power point-to-point HVDC transmission links.

Standard Number PD IEC/TR 62544-2011 (High-voltage directly current (HVDC) systems—application of active filters) anticipates DC side harmonic mitigation using series and shunt mode and hybridised DC side active filters; AC side harmonic mitigation using shunt and series mode and hybridised AC side active filters; and DC link coupling between shunt and series mode components of a hybrid active filter system. These active systems employ force commutated power electronic circuits which add complexity to the otherwise inherently simple and robust LCC topology.

CSCs employing force commutated thyristors have been proposed as a means of mitigating some of the above deficiencies of LCCs, but the proposed circuits include large and complex auxiliary commutation circuits in addition to the otherwise inherently simple and robust LCC topology.

More recently, voltage source converters (VSCs) have been increasingly used in HVDC transmission link systems having moderately high power ratings. VSCs achieve reversible power flow by allowing HVDC transmission link current to reverse, thereby allowing the use of a unipolar HVDC transmission link voltage and cables with near ideal elastomeric insulation systems. VSCs also address the HVAC grid harmonic and power factor limitations of LCCs. Moreover, VSCs, in having near independent control of real and reactive power, have been able to assist HVAC grid frequency and voltage stability. All converters are subject to compromise. Whilst VSCs overcome known limitations of LCCs, they incur the penalty of increased power losses or reduced efficiency. In most practical applications, VSCs have not been able to limit HVDC transmission link short circuit (or low resistance) fault current. As a result, recent development activity in VSCs has been directed to try and overcome these penalties.

VSC technologies have developed in the following four evolutionary stages:

Two-level pulse width modulated (PWM) VSCs with series-connected IGBTs first addressed the limitations of LCCs but the efficiency penalty was serious and DC fault current could not be limited. Large high performance passive filters were used to minimise the effects of the PWM arm voltages. HVDC transmission link short circuit fault current included a substantial inrush component from the DC link capacitor.

Three-level PWM VSCs with series-connected IGBTs improved the trade off between efficiency, passive filter specification, and VSC benefits. HVDC transmission link short circuit fault current included a reduced but still substantial inrush component from the DC link capacitor.

Multi-level modular converter (MMC) VSCs have recently been derived from existing two-level VSC elements by series connecting chains of modules which each contain basic VSC elements. These chains of modules are connected in a bridge topology and stepwise approximations of sinusoidal and anti-phase sinusoidal voltages are synthesized respectively in the positive and negative arms of each particular phase. The most primitive half-bridge MMC has greater efficiency than the three-level PWM VSC, but is unable to limit DC fault current whereas the H-bridge MMC is able to limit DC fault current but has nearly twice the power loss of the half-bridge MMC. Each MMC module has a DC link capacitor whose voltage must be controlled by regulating MMC module power flow and whose capacitance is sufficient to limit module DC link voltage ripple. These MMCs employ extremely complex IGBT firing sequences in order to synthesise stepwise voltage waveforms which must adapt to HVAC grid voltage and line current whilst also adapting to the effects of component failures within MMC modules and regulating DC link capacitor voltage. It is because individual IGBTs switch at HVAC grid fundamental frequency and switching losses are minimal that MMC VSC efficiency is far greater than that of PWM VSCs. The stepwise synthesis of arm voltages has allowed the size and complexity of passive filters to be reduced relative to that in PWM VSCs. The MMC VSC has revolutionised the scope of application of VSCs by being modular and scaleable to high power and high voltage ratings. HVDC transmission link short circuit fault current still includes a substantial inrush component from the DC link capacitors, but this may be partially mitigated by employing a protective firing sequence.

Most recently the hybridisation of conventional quasi-square wave VSC bridges comprising series-connected IGBTs with MMC VSCs that are configured to act as DC link shunt mode or in-arm series mode active filters has been disclosed as a means of combining the harmonic and power factor mitigating capabilities of the MMC VSC with the efficient power handling of the quasi-square wave VSC. Zero voltage switching is achieved in the IGBTs in the quasi-square wave VSC circuits. The hybrid arrangement with DC shunt mode MMC VSC active filtration cannot limit DC fault current, but benefits from a MMC of reduced complexity relative to three-phase MMC VSC and has a greater efficiency than three-phase MMC VSCs. The ability of the shunt mode MMC VSC active filter to mitigate the effects of DC and AC side harmonic effects simultaneously is subject to significant compromise. The hybrid arrangement with in-arm series mode MMC VSC active filtration can limit DC fault current, but suffers the penalty of having a MMC whose complexity is comparable to that of a three-phase MMC VSC and has a lower efficiency than that of the DC shunt mode MMC filtered hybrid. As a result of employing VSC technology throughout these hybrid circuits, HVDC transmission link short circuit fault current still includes a substantial inrush component from the MMC module DC link capacitors, but this may be partially mitigated by employing a protective firing sequence.

Accordingly, the present invention seeks to better hybridise an efficient rectifying and inverting power conversion circuit that can rapidly limit AC and DC side fault current, with active DC ripple, AC harmonic and power factor mitigating circuits.

SUMMARY OF THE INVENTION

Embodiments of the present invention provide a current source converter (CSC) that retains the efficiency, availability, and DC fault current limiting of the conventional line commutated converter (LCC) whilst overcoming its requirement for DC link voltage reversal in order to achieve reversible power flow, susceptibility to inverter commutation failure, and poor AC power factor. At the same time, the converter of embodiments of the present invention can be utilised in a similar manner to conventional voltage source converters (VSCs), for example, in the context of point-to-point DC transmission links and multi-terminal DC grids.

As used herein, the term 'available circuit commutated turn-off time' (or tq) defines the time that is available for the power semiconductor devices of the converter to turn 'off' and is the time interval between the instant when the anode current in an outgoing power semiconductor device has decreased to zero and the instant when the anode-cathode voltage undergoes a polarity change from negative to positive. In a natural commutation process, the anode current reversal in an outgoing power semiconductor device is a consequence of turning 'on' an incoming power semiconductor device and the anode-cathode voltage polarity change is a consequence of an AC line voltage zero crossing. The term 'recovery time' is used herein to define the time taken for an outgoing power semiconductor device to complete a sequential reverse recovery and forward recovery process when a defined gate terminal bias is present, i.e., until it regains a forward-blocking capability. The effective recovery time can be influenced by an applied gate terminal bias. It will be readily appreciated that in a natural commutation process the recovery time must be shorter than the available circuit commutated turn-off time. If the forward recovery process is not complete before the end of the available circuit commutated turn-off time, then anode current will flow in the outgoing power semiconductor device as soon as the anode-cathode voltage becomes positive and would increase to a catastrophic level. This failure to turn 'off' is often called miscommutation. A gate-assisted natural commutation process that ensures that the outgoing power semiconductor devices regain a forward-blocking capability in a timely manner under conditions where the available circuit commutated turn-off time is shorter than would be required by a conventional LCC is described in more detail below.

An embodiment of the present invention provides a converter comprising: a bridge having an AC terminal for each of one or more AC lines, first and second DC terminals, a converter arm being connected between each respective AC terminal and the first DC terminal, and a converter arm being connected between each respective AC terminal and the second DC terminal, each converter arm including a first power semiconductor switching device capable of being turned 'on' and 'off' by gate control and having a recovery time. The converter is adapted to be operated in one or more of the following inverting modes: (a) a naturally commutated inverting mode where, during each commutation event, an incoming first power semiconductor switching device is turned 'on' by gate control at a point in time that is in advance of a reference time such that anode current in the incoming first power semiconductor switching device increases at a determined rate and anode current in an outgoing first power semiconductor switching device decreases at a determined rate, the outgoing first power semiconductor device is turned 'off' by gate control at the reference time, and the available circuit commutated turn-off time is greater than the recovery time that is applicable with an open circuit gate terminal bias applied; (b) a naturally commutated inverting mode where, during each commutation event, an incoming first power semiconductor switching device is turned 'on' by gate control at a point in time that is in advance of a reference time such that anode current in the incoming first power semiconductor switching device increases at a determined rate and anode current in an outgoing first power semiconductor switching device decreases at a determined rate, the outgoing first power semiconductor switching device is turned 'off' by gate control at the reference time, and the available circuit commutated turn-off time is shorter than the recovery time that is applicable with an open circuit gate terminal bias applied, the available circuit commutated turn-off time optionally being zero or close to zero; and (c) a combined naturally commutated and gate commutated inverting mode where, during each commutation event, an incoming first power semiconductor switching device is turned 'on' by gate control at a point in time that is in advance of a reference time such that anode current in the incoming first power semiconductor switching device increases at a determined rate and anode current in an outgoing first power semiconductor switching device decreases at a determined rate, the outgoing first power semiconductor switching device is turned 'off' by gate control at the reference time or at a point in time that is delayed beyond the reference time, and the available circuit commutated turn-off time is less than zero.

The converter can be further adapted to be operated in the following mode: (d) a gate commutated inverting mode where, during each commutation event, an outgoing first power semiconductor switching device is turned 'off' by gate control without an incoming first power semiconductor switching device being turned 'on' by gate control.

All of the first power semiconductor switching devices in a particular bridge may be of the same type. A first power semiconductor switching device may be a reverse blocking device that is optimised for natural commutation at AC line frequency with a defined gate bias applied, has low conduction losses, has a repetitive ability to be gate (or force) commutated from an anode current that is less than about 50% of its nominal rated anode current, and has an intermittent capability to be gate commutated from an anode current that is at least about 100% of its nominal rated anode current. Examples of particular types of first power semiconductor switching devices would include gate turn-off thyristors (GTOs) or gate commutated turn-off thyristors (GCTs) that are used in conjunction with an external gate drive circuit that permits the devices to have gate assisted natural commutation in addition to achieving the required gate commutated performance under unity gain turn-off conditions.

The converter can be further adapted to be operated in a rectifying mode as long as the voltage between the first and second DC terminals is allowed to reverse. The first power semiconductor switching devices are operated in a naturally commutated rectifying mode in the same way as a conventional LCC but with appropriate modification to the gate drive sequencing, this modification being effected by maintaining an 'on' state gate drive command throughout the normal LCC conduction period and maintaining an 'off' state gate drive command throughout the normal LCC 'off' state period.

For bi-directional power flow without DC voltage reversal, each converter arm can further include a second power semiconductor switching device being capable of being turned 'on' by gate control (e.g., a conventional thyristor) and where the first and second semiconductor switching devices in each converter arm are connected in anti-parallel.

When such a converter is operated as an inverter, the second power semiconductor switching devices are not turned 'on' by gate control and when operated as a rectifier, the first power semiconductor switching devices are maintained in an 'off' state by gate control and the second power semiconductor switching devices are operated in a naturally commutated rectifying mode in the same way as a conventional LCC.

When the converter is operated as an inverter, the first power semiconductor switching devices are operated in one or more of modes (a) to (c), and optionally also in the protective mode (d). The operation of the converter can be controlled according to a suitable control process, e.g., by a controller which may synchronise and phase shift the firing sequence relative to the associated AC grid line voltage waveform, in response to a phase control signal, in order to control the ratio of converter DC terminal voltage to AC terminal voltage. Any convenient control and protection functions can be used to provide the phase control signal. For example, a closed-loop AC line current regulator with DC link voltage dependent droop and current limiting terms could be used to regulate inverter output power whilst safeguarding DC transmission voltage and converter thermal stress. A phase control action, a change in DC link current, a change in AC line voltage waveform, or any combination thereof, would generally cause the available circuit commutated turn-off time to vary and the first power semiconductor switching devices can be operated accordingly. The principle of zero turn-off (ZTO) applies during mode (b) where the available circuit commutated turn-off time is less than the recovery time that is applicable with an open circuit gate terminal bias applied and is preferably zero or close to zero. In the combined naturally commutated and gate commutated inverting mode (c) the firing sequence can have an immediate effect upon the commutation process, but not the underlying control process, in that outgoing first power semiconductor switching devices are turned 'off' by gate control at an appropriate time. In mode (c) the firing of the incoming first power semiconductor switching devices can be delayed relative to modes (a) and (b) and the effect is that the available circuit commutated turn-off time is reduced beyond zero, i.e., it effectively becomes negative. In practice, the firing sequence might be common to modes (a), (b) and (c) with the gate turn-off of the outgoing first power semiconductor devices having no immediate effect during modes (a) and (b). More particularly, it can be seen that the control process in modes (a), (b) and (c) is similar in as much as the incoming first power semiconductor switching devices are turned 'on' by gate control at a point in time that is in advance of a reference time and the outgoing first power semiconductor switching devices are turned 'off' by gate control at the reference time (or optionally for mode (c) at a point in time that is delayed beyond the reference time). It will be readily appreciated that the behaviour of the outgoing first power semiconductor switching devices changes according to the anode current that flows prior to the outgoing first power semiconductor switching devices being turned 'off' by gate control and it is this behaviour that defines if the converter is operating in mode (a), (b) or (c).

In mode (a) the first power semiconductor switching devices behave like the thyristors in a conventional LCC. In the anti-parallel arrangement, the second power semiconductor switching devices are pulse suppressed, i.e., they do not receive a gate drive current, so that they remain in the 'off' state. The available circuit commutated turn-off time is greater than the recovery time. This means that the available circuit commutated turn-off time is greater than what is required by the outgoing first power semiconductor devices to turn off reliably and the commutation process is not reliant upon gate turn-off assistance. Since the outgoing first power semiconductor devices have fully recovered by the reference time, minimal gate current flows into the associated gate drivers as the anode-cathode voltage becomes forward biased. Mode (a) would generally be used when the ratio of AC line voltage divided by DC link voltage is particularly high, for example, when the DC link voltage is unusually low during the process that follows the clearance of a DC link short circuit or low resistance fault.

Mode (b) is closely related to mode (a). However, in mode (b) the available circuit commutated turn-off time is shorter than the recovery time. The available circuit commutated turn-off time can even be zero or close to zero. If the converter is operated in mode (b) the first power semiconductor switching devices must, therefore, have a ZTO capability and the commutation process is reliant upon gate turn-off assistance. Since the outgoing first power semiconductor devices have not fully recovered by the reference time, a small gate current flows into the associated gate drivers as the anode-cathode voltage becomes forward biased. Mode (b) is generally the operating mode of the converter whenever power system operational requirements permit because the converter efficiency is high as a result of the natural commutation process, AC line power factor is greater than what can be achieved in a conventional LCC, and so the MVA rating of the converter can be minimised. Generally, during mode (b) the converter is operated near to the limit case, i.e., where the available commutated circuit turn-off time is zero or close to zero, because this maximises efficiency and power factor efficiency. When intentionally operating close to the limit case for mode (b), small perturbations in parameters such as the DC link current, DC line voltage, and AC line voltage, may cause the available commutated circuit turn-off time to become less than zero such that the converter will operate in mode (c).

Mode (c) can be considered as having two distinct stages. The first stage is similar to mode (a) in as much as the anode current in the outgoing first power semiconductor switching devices initially reduces at a rate that corresponds substantially with the rate of increase of anode current in incoming first power semiconductor switching devices. However, in the second stage the initial rate of change of anode current in outgoing first power semiconductor switching devices is truncated significantly by gate turn-off of the outgoing first power semiconductor switching devices. In other words, natural commutation is initiated, but is not allowed to proceed to completion because gate commutation occurs. The available commutated circuit turn-off time is less than zero and the outgoing first power semiconductor devices are reliant upon gate turn-off assistance to turn off. At the point in time when the outgoing first power semiconductor devices are turned 'off' by gate control (i.e., the reference time or a point in time that is delayed beyond the reference time) a gate current that is in excess of the anode current of the outgoing first power semiconductor devices flows into the associated gate drivers as the anode-cathode voltage becomes forward biased. The gate current eventually decays during the increase in the anode-cathode voltage. Mode (c) is generally used as a safety measure when intentionally operating the converter close to the limit case of mode (b). However, in some situations, mode (c) can be the preferred operating mode of the converter.

In mode (c) the outgoing first power semiconductor switching device can be turned 'off' by gate control when the anode current in the outgoing first power semiconductor switching devices falls below a pre-determined threshold, for example, when the anode current in outgoing first power semiconductor switching devices has reduced to a proportion of DC link current (Idc) that is greater than 0% of Idc and more particularly, less than about 70% of Idc, and even more particularly less than about 20% of Idc.

The gate commutation of anode current in outgoing first power semiconductor switching devices causes a correspondingly rapid change in AC line current and this causes a voltage transient to be developed across the transformer reactance of the affected AC lines. Surge arrestors are preferably employed to limit the magnitude of the voltage transient and the corresponding voltage transient that is experienced across outgoing first power semiconductor switching devices. The surge arresters may be metal oxide varistors (MOV) or similar non-linear resistive elements connected between the AC lines. The surge arresters may also comprise series-connected resistance and capacitance (RC) networks between AC lines or a combination of MOV and RC networks. The first power semiconductor switching devices can also be provided with parallel-connected switching aid networks (snubbers) that may suffice to limit the voltage transient in cases where gate commutation is initiated when anode current is at a relatively low proportion of Idc, optionally less than about 10% (or about 5%) of rated Idc.

Compared to a conventional LCC, the converter according to an embodiment of the present invention produces reduced harmonic forcing voltage so smaller AC- and DC-side harmonic filters are needed. It is necessary to recognise that use of gate commutation causes the switching losses in the first power semiconductor switching devices to increase and it is important that the upper limit of commutating inductance and associated inductively stored energy at the time of gate commutation are no greater than is practically necessary, also that the magnitude of anode current that is gate commutated has a direct bearing upon the magnitude of the above-described voltage transient and/or the specification of the associated surge arrester and switching aid network components. For example, mode (c) is subject to a compromise between power factor correction and harmonic filtration, and increased switching losses and the requirement to moderate transient voltages.

Optional mode (d) involves a gate commutation process that is the same as the second stage of mode (c), but without the first stage where incoming first power semiconductor switching devices are turned 'on' by gate control. The anode current in the outgoing first power semiconductor switching devices at the time of gate commutation is, therefore, equal to the DC link current. Mode (d) does not share a common control process with modes (a) to (c) and is generally employed only at times when a low impedance fault is applied to the AC grid-side of the converter transformer (see below) and therefore, only at times when the AC line voltage is very low. As is evident from the description of the second stage of mode (c), the magnitude of anode current that is gate commutated has an important bearing upon the nature of the associated voltage transients, but it must be noted that, whilst the inductively stored energy that is present in the affected AC lines at the point in time at which gate commutation occurs is significantly increased during this commutation mode, the AC line voltage is low under the specified low impedance fault conditions. The existence of such a low AC line voltage at the time of the gate commutation of a high value of anode current permits economies to be made in the specification of the surge arrester and switching aid network components and these economies may be further enhanced by causing any AC grid-side circuit breaker to open, thereby limiting the duration of the fault. It is also possible to interrupt the fault current without waiting for the AC grid-side circuit breaker to open. Whichever approach is used, energy is trapped in the DC circuits and this must be dissipated at the time the DC link current is interrupted. Although mode (d) is optional, it is expected that any practical converter will have the capability to interrupt AC grid-side low impedance fault currents.

The AC terminal(s) of the converter can be connected to an AC grid or distribution network, optionally a high voltage alternating current (HVAC) grid. Such a connection is preferably made by means of a phase-shifting converter transformer whose converter-side windings are optionally interconnected at their low voltage end by an active filter such as a series mode voltage source active filter. An active filter such as a shunt mode active filter and/or a static compensator can be connected to the AC lines or AC grid in order to define the commutating reactance of the converter and the harmonic distortion and power factor of current in the AC grid. The converter transformer can have any suitable construction, for example, a 2×3 phase transformer arrangement can be used to permit twelve-pulse operation.

The DC terminals of the converter can be connected to a DC link, optionally a DC grid/network, a point-to-point high voltage direct current (HVDC) transmission link, or an element of a multi-terminal HVDC grid. Such a connection can be made by means of a passive filter. The converter can be used with the following types of DC link: symmetrical monopole, asymmetric monopole, symmetrical bipole, and asymmetric bipole employing any convenient grounding and switching arrangements. Bi-directional power flow in the DC link can be achieved by causing the DC link current to reverse, the respective ratings of the first and second power semiconductor switching devices optionally being optimised for any asymmetry in the power flow directions.

A point-to-point DC transmission link would generally have a converter at each end of its transmission cable, one of the converters operating as a rectifier while the other converter is operated as an inverter. In the case of bi-directional power flow, one of the converters will be operated as a rectifier while the other converter is operated as an inverter, while power flow is in a first direction and with the rectifying and inverting functions being exchanged and power flow is in the opposite direction. A terminal of a multi-terminal DC grid would generally have a single converter, which could also be capable of accommodating bi-directional power flow by exchanging its rectifying and inverting functions. A multi-terminal DC grid could have a mixture of different converter types as long as the DC interface requirements were appropriately coordinated and specified.

The converter can be capable of actively limiting DC-side fault current without a requirement for a DC circuit breaker (e.g., an HVDC circuit breaker) but can be used in conjunction with such a DC circuit breaker to provide off load isolation of the converter from the DC link. Fault current can be limited by the converter, the DC circuit breaker, or by a combination of both devices. In the latter case, the protective performance requirement of the DC circuit breaker can be reduced. If a DC circuit breaker is provided, then it can be used to limit fault current that is fed from the DC link into the converter and/or the AC grid that is connected to the converter. An ac circuit breaker (e.g., an HVAC circuit breaker) can also be used to limit fault current that is fed from the AC grid into the converter and/or the DC link that is connected to the converter. The inherent ability of the converter to limit and interrupt DC fault current without the assistance of a DC circuit breaker is beneficial in reducing the maximum prospective fault current that may be applied to the transmission lines of the DC link and switchgear of either a point-to-point DC transmission link or a multi-terminal DC grid.

As with a conventional LCC, the DC link voltage is derived from the corresponding AC line voltage, and the frequency spectra of these voltages are, therefore, harmonically related. The underlying terminal voltage harmonic relationship of the converter is defined by a so called 'pulse number' in the same way as that of the conventional LCC. In three-phase systems where the bridge has three AC terminals, the pulse number is a multiple of six because there are six arms of controllable power semiconductor devices in each bridge and the fundamental frequency component of the DC ripple voltage spectrum is at six times the fundamental frequency of the voltage that is applied to the AC terminals. The converter can include any convenient number of bridges with their DC terminals interconnected in series. For example, if a converter includes two bridges connected in series then this defines a twelve-pulse system having twelve ripple cycles in DC link current per cycle of AC line fundamental frequency. The magnitudes of DC- and AC-side voltage harmonics, in addition to being inter-related, are influenced by phase control, commutation mode and commutation reactance, as described in more detail later. The DC line voltage of the converter includes harmonic components, yet the converter can be connected to a DC transmission link whose interface specification may impose strict limits upon voltage and current ripple spectra. Accordingly, the DC terminals of the converter are preferably connected to the DC link by means of a passive filter, which comprises at least a DC link inductor and which may optionally comprise a number of capacitance resistance filter elements. An important objective of the converter is that it is capable of providing a DC link current that has an acceptably low voltage and current ripple without recourse to dominantly capacitive circuits that would cause large capacitive inrush currents to flow in the event of a short circuit or low impedance fault being applied to the DC link.

As is the case for a conventional LCC, an increase in the pulse number of the converter causes a reduction in the magnitudes of DC link voltage harmonics and an increase in the frequency of DC link voltage harmonics, thereby allowing economies to be made in the specification of the DC link inductor for a particular DC ripple spectrum. Similarly, increases in converter phase control angles, e.g., firing advance angle $\beta$ and firing delay angle $\alpha$, cause an increase in magnitude of voltage steps that are experienced in the DC line voltage of the converter. Modes (b) and (c) allow reductions in both phase control angles as described in more detail below with reference to FIG. 3. The AC line commutating reactance also has an influence upon harmonic performance in as much as it also influences inverter and rectifier commutation overlap angles $\mu$ and $\gamma$, respectively, but the effect of commutating reactance upon voltage regulation is of greater significance.

As is the case for a very high power HVDC converter terminal employing conventional LCCs, it is within the scope of embodiment of the present invention that any convenient number of converters may have their DC terminals connected in parallel in order to satisfy a requirement for a particularly high DC current rating or to permit gradual degradation of power system performance following failures of individual converters. Any AC- or DC-side protective switchgear would normally be provided on a 'per converter' basis in order to reduce the risk of single point failures. It is also within the scope of embodiments of the present invention that the converter transformers of such parallel-connected converters may employ suitable phase shifts to permit higher pulse number working. For example, if a first converter is provided with a six-phase converter transformer in order to provide twelve-pulse series operation, and a second, identical converter is to be connected in parallel with the first converter, then the six phases of the converter transformer associated with the second converter may be phase shifted by 15° relative to the six phases of the converter transformer associated with the first converter in order to provide twenty-four-pulse series-parallel operation. That is, where the current in the DC terminals of the first converter contains twelve ripple cycles per cycle of AC grid frequency, where the current in the DC terminals of the second converter also contains twelve ripple cycles per cycle of AC grid frequency, where these twelve ripple cycles are phase displaced by 15° of AC grid frequency relative to the twelve ripple cycles from the first converter, and where the combined current in a point of common coupling between the respective DC terminals of the first and second converters and the DC link contains twenty-four ripple cycles of reduced amplitude per cycle of AC grid frequency.

Even with the reduced phase control angles that are permitted with embodiments of the present invention, significant DC line voltage ripple is generated and accordingly, the converter may optionally employ a series mode voltage source active filter to inject anti-phase voltage ripple components into each AC line. The active filters may each employ any convenient voltage source converter (VSC) topology. An active filter can be connected to the AC lines that are associated with each converter as they emerge from the ends of the converter transformer windings that would otherwise form a star point. In essence, although the series mode voltage injection could be inserted at the point where the AC lines enter the converter, more particularly the injection may be made at the other end of the converter transformer windings in order to allow the injection voltages to be generated by a common active filter circuit and to avoid the use of an active filter (and optional coupling transformer) for each AC line. Each active filter produces a set of AC line voltages that are synchronous with, are harmonically related to, and are summated with, the associated AC voltages of the converter transformer, thereby effectively causing equivalent voltage injections to be inserted into the DC line voltage of the converter. Having actively filtered the DC line voltage, further economies may be made in the specification of the DC link inductor for a particular DC transmission line ripple spectrum and more particularly, even if capacitive filtration is used to limit the ripple spectrum, the capacitance and associated maximum prospective capacitive inrush current may be limited. In the case of a six-pulse converter, a single three-phase series mode active filter may be employed. In the case of a twelve-pulse converter, two three-phase series mode active filters may be employed. Each series mode active filter may have only three terminals and therefore, each active filter may experience zero time averaged power input or output as a consequence of the voltage injection process and so the voltage injection may be controlled to be of either polarity at particular times in order to cause power flow into or out of the active filter to be controlled. The series mode active filter will, therefore, usually have a control strategy that permits alternating power flow in order to exert control over converter DC harmonic voltages and that prevents time averaged power flow from accumulating.

As is the case for a conventional LCC, the AC line current may be drawn at a power factor that is less than unity. Increases in phase control angles, i.e., firing advance angle $\beta$ and firing delay angle $\alpha$, cause a reduction in power factor and therefore, modes (b) and (c) allow reductions in both phase control angles. The AC line commutating reactance also has an influence upon power factor in as much as it is responsible for the phase lag in AC line current that is associated with inverter and rectifier commutation overlap angles $\mu$ and $\gamma$, respectively, but the effect of commutating reactance upon voltage regulation is of greater significance.

Although the above-described reduced phase control angles upon AC grid-side harmonics is significant, the use of series mode active filters to reduce DC line ripple voltage and current opposes this effect and the combined effects of the above-described aspects of DC line filtration may cause the total harmonic distortion of AC line current harmonics to be worsened relative to that of a conventional LCC. Accordingly, the AC line current may optionally use power factor correction and filtration equipment connected to the AC lines on the AC grid-side of the converter transformer. This equipment may be of any convenient type and the use of shunt mode voltage source converter type static compensation and active filtration in combination with passive components may be used. The rating of the static compensation aspect of this equipment will be beneficially reduced relative to the rating that would be required in the case of a conventional LCC on account to the use of reduced phase control angles in the converter.

In the event that shunt mode voltage source converter equipment is used for static compensation and active filtration purposes, this may be provided with an ancillary DC link power supply of sufficient capacity to enable the optional converter transformer and AC lines to be energised prior to AC circuit breaker closure, thereby allowing inverting mode control to be established and proven, whether or not the AC grid is energised at the time. Given the provision of this ancillary DC power supply and shunt mode voltage source converter, the non-reliance of modes (b) and (c) upon the presence of a pre-existing AC grid voltage with a capacity to apply load current at a substantially leading power factor, gives the converter the ability to 'black start' an 'islanded' AC grid. Moreover, if an AC grid voltage is present, the converter transformer may be energised and synchronised to the AC grid by the converter controls, thereby substantially eliminating transformer inrush at the time of circuit breaker closure.

The converter may be used to pre-charge, regulate and stabilise the voltage of a previously de-energised DC link, which, as previously mentioned, may be a DC grid/network, a point-to-point DC transmission link, or a multi-terminal DC grid. The converter may be exposed to a high capacitance load without excessive current inrush and the converter may perform this function without recourse to the additional pre-charge components that are required in the case of conventional VSCs. The converter transformer must be energised in order to allow the converter to perform this pre-charging function, and the transformer energisation may be performed by either of the AC grid or the above-described ancillary power supply and shunt mode voltage source converter.

According to an embodiment, there is an arrangement comprising a converter, an AC grid, and a DC Link. The converter comprises a bridge, which includes: an AC terminal for each of at least one AC line; first and second DC terminals; a first converter arm connected between each respective AC terminal and the first DC terminal; and a second converter arm connected between each respective AC terminal and the second DC terminal, wherein the first and second converter arms comprises at least one first power semiconductor switching device configured to be turned 'on' and 'off' by gate control, and a recovery time. The converter is configured to operate in at least one of the following inverting modes: (a) a first naturally commutated inverting mode wherein, during each commutation event, an incoming first power semiconductor switching device is turned 'on' by gate control at a point in time in advance of a reference time such that anode current in the incoming first power semiconductor switching device increases at a determined rate and anode current in an outgoing first power semiconductor switching device decreases at a determined rate, the outgoing first power semiconductor device is turned 'off' by gate control at the reference time, and the available circuit commutated turn-off time is greater than the recovery time that is applicable with an open circuit gate terminal bias applied; (b) a second naturally commutated inverting mode wherein, during each commutation event, the incoming first power semiconductor switching device is turned 'on' by gate control at a point in time in advance of a reference time such that anode current in the incoming first power semiconductor switching device increases at a determined rate and anode current in the outgoing first power semiconductor switching device decreases at a determined rate, the outgoing first power semiconductor switching device is turned 'off' by gate control at the reference time, and the available circuit commutated turn-off time is shorter than the recovery time that is applicable with an open circuit gate terminal bias applied, the available circuit commutated turn-off time optionally being zero or close to zero; and (c) a combined naturally commutated and gate commutated inverting mode wherein, during each commutation event, the incoming first power semiconductor switching device is turned 'on' by gate control at a point in time in advance of a reference time such that anode current in the incoming first power semiconductor switching device increases at a determined rate and anode current in the outgoing first power semiconductor switching device decreases at a determined rate, the outgoing first power semiconductor switching device is turned 'off' by gate control at the reference time or at a point in time that is delayed beyond the reference time, and the available circuit commutated turn-off time is less than zero. The at least one AC lines of the converter is connected to the AC grid, and the DC terminals of the converter are connected to the DC link.

According to an embodiment, there is an arrangement comprising a plurality of converter. The plurality of converter comprising a bridge, which includes: an AC terminal for each of at least one AC line; first and second DC terminals; a first converter arm connected between each respective AC terminal and the first DC terminal; and a second converter arm connected between each respective AC terminal and the second DC terminal, wherein the first and second converter arms comprises at least one first power semiconductor switching device configured to be turned 'on' and 'off' by gate control, and a recovery time. The converter is configured to operate in at least one of the following inverting modes: (a) a first naturally commutated inverting mode wherein, during each commutation event, an incoming first power semiconductor switching device is turned 'on' by gate control at a point in time in advance of a reference time such that anode current in the incoming first power semiconductor switching device increases at a determined rate and anode current in an outgoing first power semiconductor switching device decreases at a determined rate, the outgoing first power semiconductor device is turned 'off' by gate control at the reference time, and the available circuit commutated turn-off time is greater than the recovery time that is applicable with an open circuit gate terminal bias applied; (b) a second naturally commutated inverting mode wherein, during each commutation event, the incoming first power semiconductor switching device is turned 'on' by gate control at a point in time in advance of a reference time such that anode current in the incoming first power semiconductor switching device increases at a determined rate and anode current in the outgoing first power semiconductor switching device decreases at a determined rate, the outgoing first power semiconductor switching device is turned 'off' by gate control at the reference time, and the available circuit commutated turn-off time is shorter than the recovery time that is applicable with an open circuit gate terminal bias applied, the available circuit commutated turn-off time optionally being zero or close to zero; and (c) a combined naturally commutated and gate commutated inverting mode wherein, during each commutation event, the incoming first power semiconductor switching device is turned 'on' by gate control at a point in time in advance of a reference time such that anode current in the incoming first power semiconductor switching device increases at a determined rate and anode current in the outgoing first power semiconductor switching device decreases at a determined rate, the outgoing first power semiconductor switching device is turned 'off' by gate control at the reference time or at a point in time that is delayed beyond the reference time, and the available circuit commutated turn-off time is less than zero. The first and second DC terminals of the plurality of converters are connected in parallel.

DRAWINGS

Figure 4:
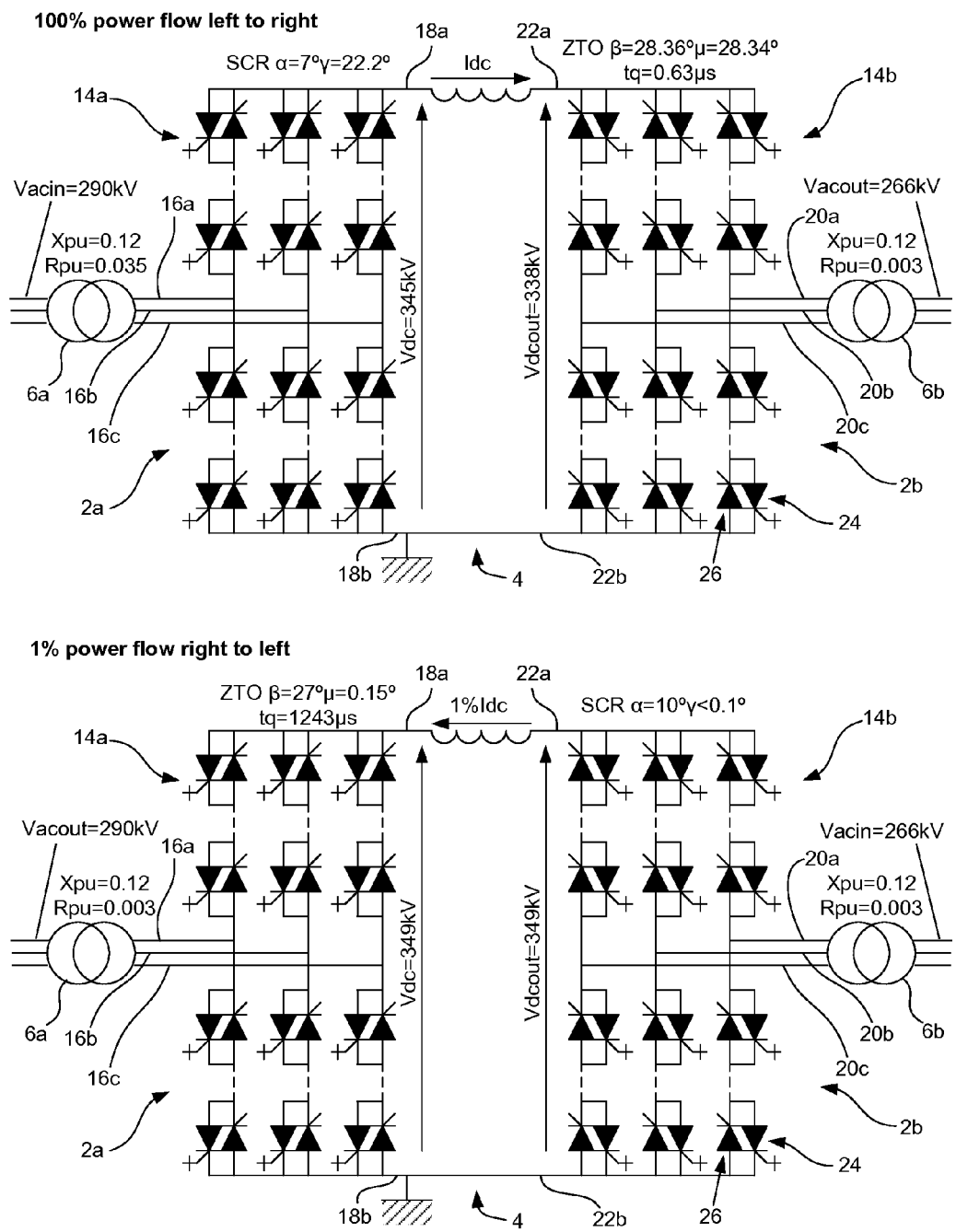
Figure 5:
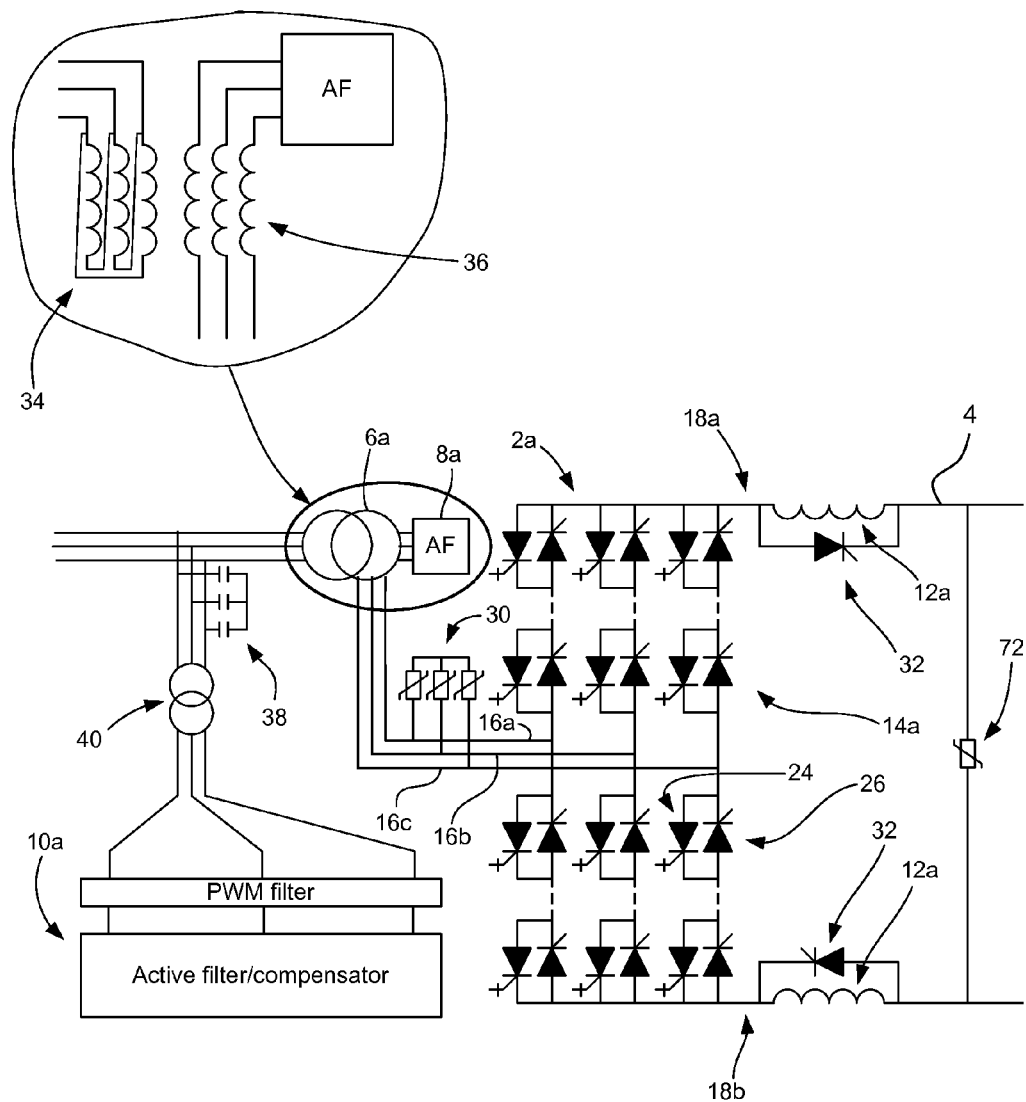
Figure 6:
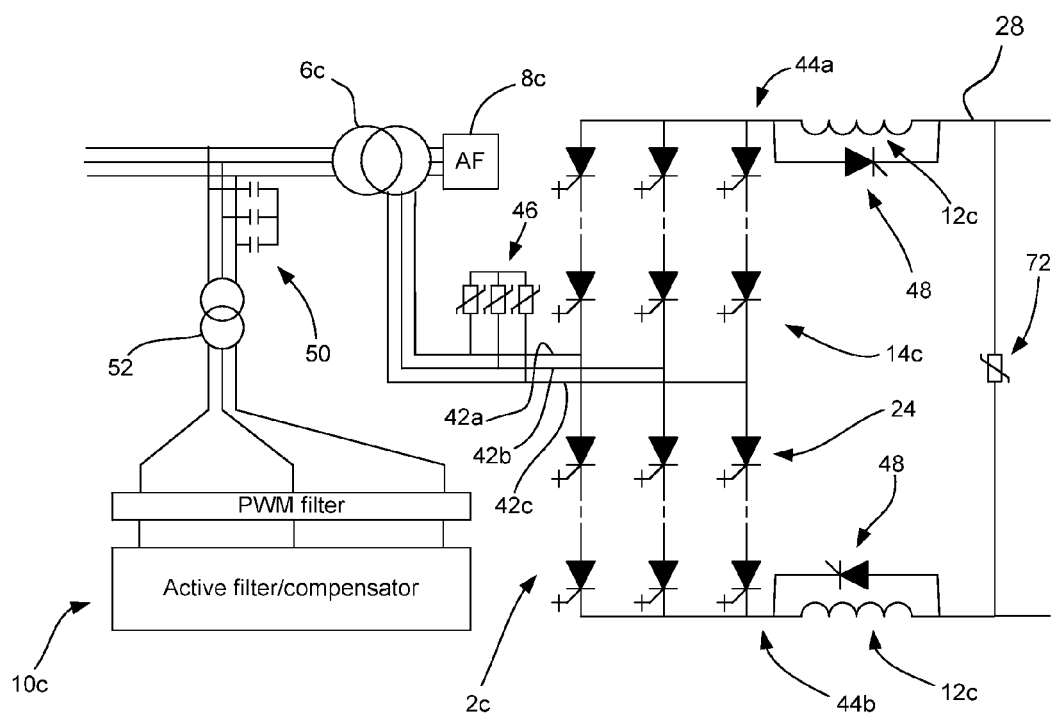
Figure 7:
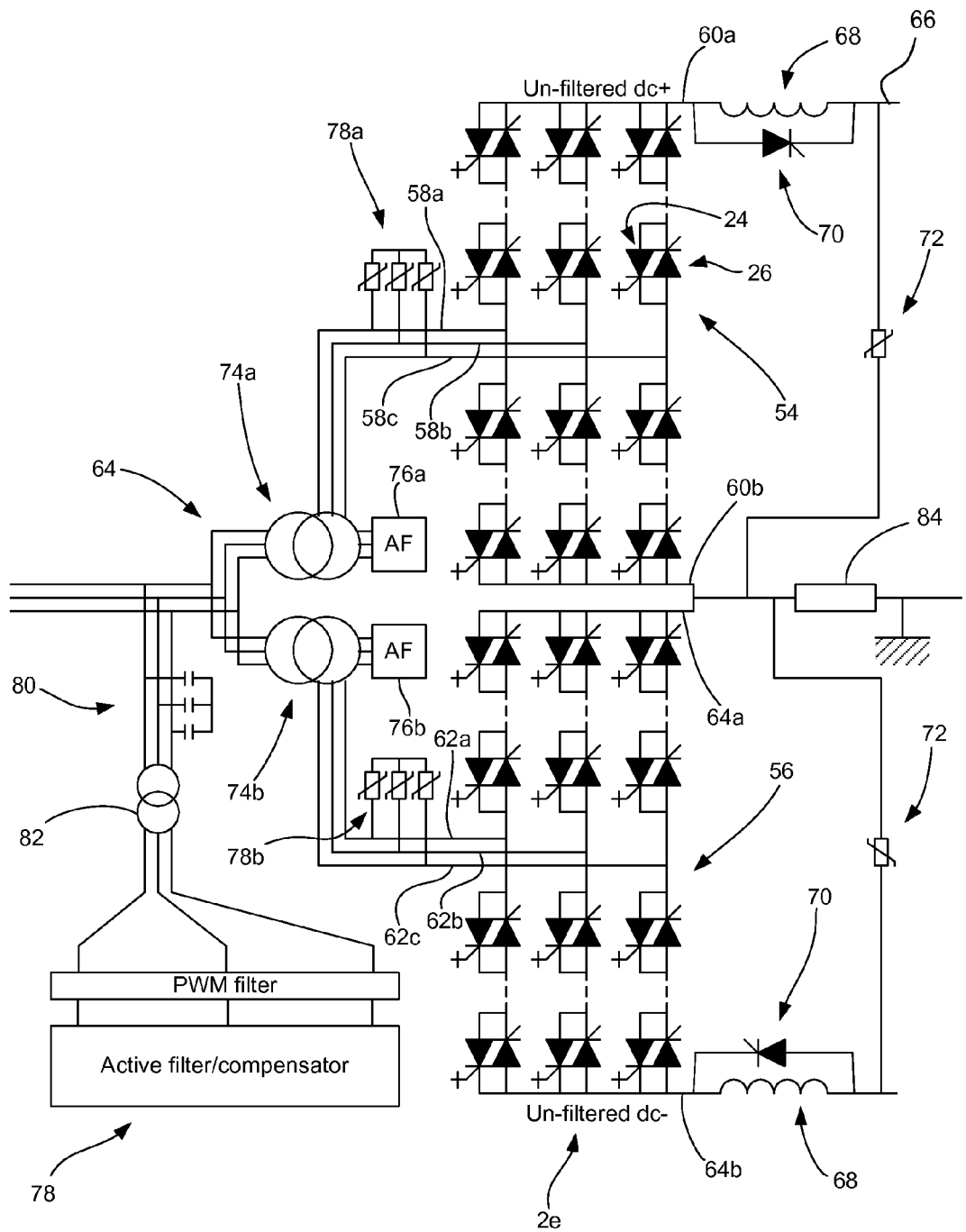

FIG. 4 a schematic drawing showing optional commutating conditions for two six-pulse converters according to an embodiment of the present invention as configured for operation in a point-to-point HVDC transmission link with highly asymmetric bi-directional power flow;

FIG. 5 is a schematic drawing showing a six-pulse converter according to an embodiment of the present invention as configured for operating in a point-to-point HVDC transmission link with bi-directional power flow or as a terminal in a multi-terminal HVDC grid with bi-directional power flow;

FIG. 6 is a schematic drawing showing a six-pulse converter according to an embodiment of the present invention as configured for operating in a point-to-point HVDC transmission link with bi-directional power flow or as a terminal in a multi-terminal HVDC grid with uni-directional power flow; and FIG. 7 is a schematic drawing showing a twelve-pulse converter according to an embodiment of the present invention connected to a symmetrical monopole point-to-point HVDC transmission link with bi-directional power flow or a symmetrical monopole multi-terminal HVDC grid with bi-directional power flow.

DETAILED DESCRIPTION OF THE INVENTION

Figure 1:
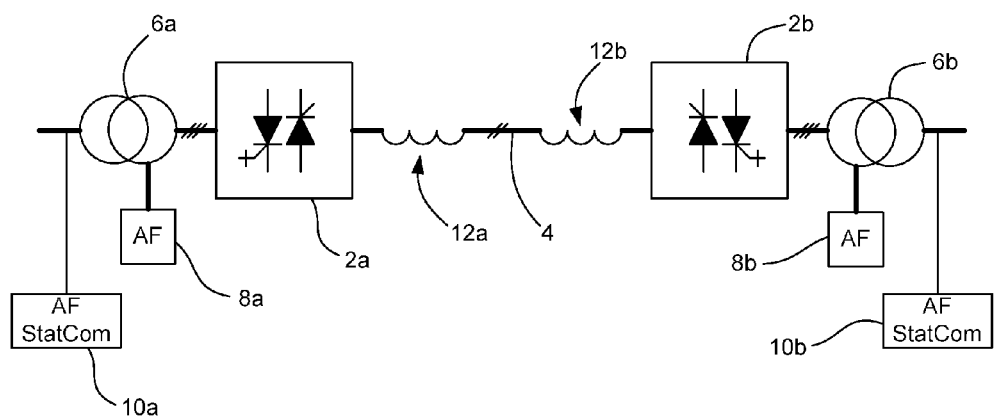
FIG. 1 is a single line schematic drawing showing a point-to-point HVDC transmission link that incorporates two converters according to an embodiment of the present invention.

With reference to FIGS. 1 and 4, a point-to-point HVDC transmission link includes a first current source converter (CSC) 2a and a second CSC 2b connected to first and second respective ends of an HVDC transmission line 4. Each CSC 2a, 2b is shown as being a three-phase transformer-fed type with an associated converter transformer 6a, 6b, a series mode voltage source active filter (AF) 8a, 8b, a shunt mode combined active filter and static compensator (AF StatCom) 10a, 10b, and a DC link inductor 12a, 12b. Surge arresters and the control system are not shown in FIGS. 1 and 4 for reasons of clarity. Active filters and filter compensators are not shown in FIG. 4 for reasons of clarity.

With particular reference to FIG. 4, each CSC 2a, 2b includes a bridge 14a, 14b. The first bridge 14a has three AC terminals 16a, 16b, 16c (i.e., one for each phase) connected to the associated converter transformer 6a and two DC terminals 18a, 18b connected to one end of the HVDC transmission line 4. The second bridge 14b has three AC terminals 20a, 20b, 20c connected to the associated converter transformer 6b and two DC terminals 22a, 22b connected to the other end of the HVDC transmission line 4.

Each bridge 14a, 14b includes a six converter arms. Each arm includes a first reverse blocking power semiconductor device ('first device' 24), which in practice can be a reverse blocking gate turn-off thyristor (GTO) or reverse blocking gate commutated turn-off thyristor (GCT), and a second power semiconductor device ('second device' 26), which in practice can be a conventional thyristor. The first and second devices 24, 26 are connected together in anti-parallel, i.e., each first device has its anode connected to the respective AC terminal and its cathode connected to the respective DC terminal and each second device has its cathode connected to the respective AC terminal and its anode connected to the respective DC terminal.

Each converter arm can include any convenient number of series-connected first devices 24 and series-connected second devices 26 to provide a bridge with a required AC line voltage rating. Groups of series-connected power semiconductor devices may be assembled within modules and any convenient number of modules may be connected in series. Pressure contact power semiconductor devices may be used in order to allow the low resistance failure mode of such devices to be exploited as a means of providing N+M type series redundancy, where N series-connected devices have adequate total voltage rating for normal working and M additional devices are connected in series to allow M devices to fail without affecting the working behaviour of the N non-failed devices. Voltage sharing and synchronised switching is achieved using any combination of passive switching aid networks (RC type snubbers), voltage sharing resistors, voltage grading capacitors and di/dt limiting reactors, which may be of saturating type. When both first and second devices 24, 26 are employed, the current ratings of the respective parallel paths need not be equal and a large level of asymmetry in current rating may be employed.

When power is controlled so as to flow from left to right in the arrangement shown in FIGS. 1 and 4, CSC 2a will operate as a rectifier and CSC 2b will operate as an inverter and vice versa.

When a CSC is operating as a rectifier, the first devices 24 are maintained in an 'off' state by gate control and the second devices 26 operate in a naturally commutated rectifier mode. When a converter is operating as an inverter, the second devices 26 are not turned 'on' by gate control and the first devices 24 are operated in one of the three inverting modes (a) to (c) (and optionally, also in mode (d)) described below with reference to FIG. 3.

Figure 2:
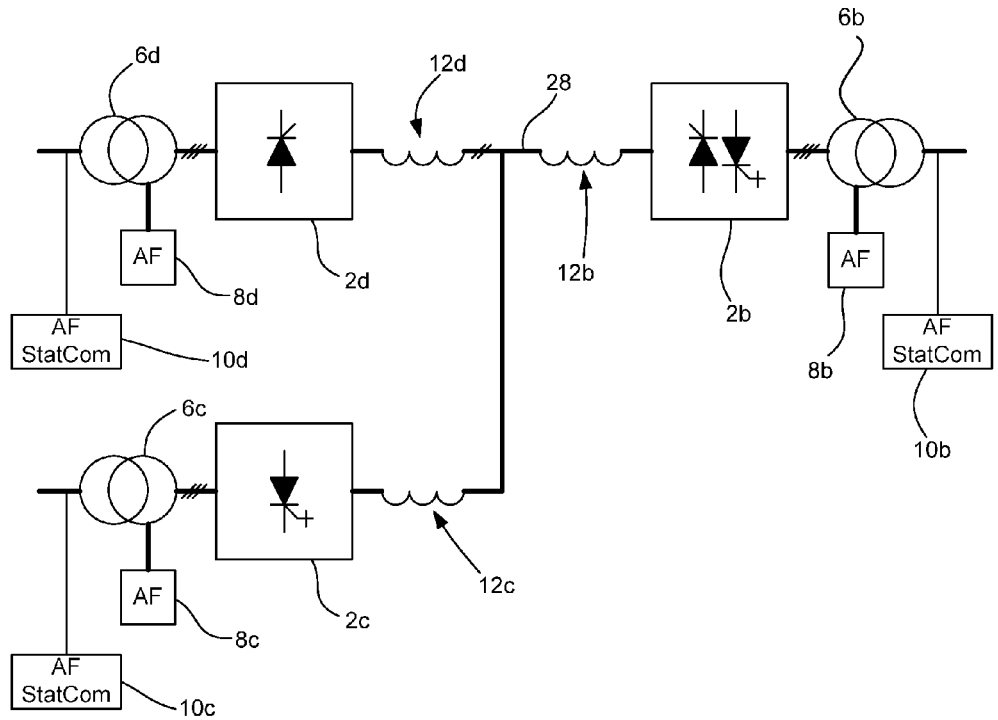
FIG. 2 is a single line schematic drawing of a multi-terminal HVDC grid that incorporates three different converters, two of which are according to an embodiment of the present invention.

FIG. 2 shows a multi-terminal HVDC grid with an HVDC transmission line 28. CSC 2b is equivalent to CSC 2b of FIG. 1, i.e., three-phase transformer-fed type with first and second devices connected in anti-parallel, and is connected to one end of the HVDC transmission line 28. CSC 2c is connected to another end of the HVDC transmission line 28 and has a bridge according to an embodiment of the present invention that includes only first devices, which in practice can be GTOs or GCTs that are operated in one of the three inverting modes (a) to (c) (and optionally, also in mode (d)) described in more detail below with reference to FIG. 3. CSC 2d is connected to another end of the HVDC transmission line 28 and has a bridge that includes only conventional thyristors that are operated as a rectifier. Each CSC has an associated converter transformer 6b, 6c, 6d, a series mode voltage source active filter (AF) 8b, 8c, 8d, a shunt mode combined active filter and static compensator (AF StatCom) 10b, 10c, 10d, and a DC link inductor 12b, 12c, 12d. Surge arresters and the control system are not shown in FIG. 2 for reasons of clarity.

When power is controlled so as to flow from left to right from CSC 2d to CSC 2b in the arrangement shown in FIG. 2, CSC 2d will operate as a rectifier and CSC 2b will operate as an inverter. CSC 2c has no ability to transmit power from left to right. When power is controlled, so as to flow from right to left from CSC 2b to CSC 2c, CSC 2b will operate as a rectifier and CSC 2c will operate as an inverter. CSC 2d has no ability to transmit power from right to left.

When CSC 2b is operating as a rectifier, the first devices 24 are maintained in an 'off' state by gate control and the second devices 26 operate in a naturally commutated rectifier mode. When CSC 2b is operating as an inverter, the second devices 26 are not turned 'on' by gate control and the first devices 24 are operated in one of the three inverting modes (a) to (c) (and optionally, also in mode (d)) described in more detail below with reference to FIG. 3. When CSC 2c is operating, the first devices 24 are operated in one of the three inverting modes (a) to (c) (and optionally, also in mode (d)) described in more detail below with reference to FIG. 3. When CSC 2d is operating, the conventional thyristors operate in a naturally commutated rectifying mode.

Such a multi-terminal HVDC grid can employ any convenient number of converters of different types, including those that are conventional. An CSC according to an embodiment of the present invention can be configured with any desired degree of power flow asymmetry.

Figure 3:
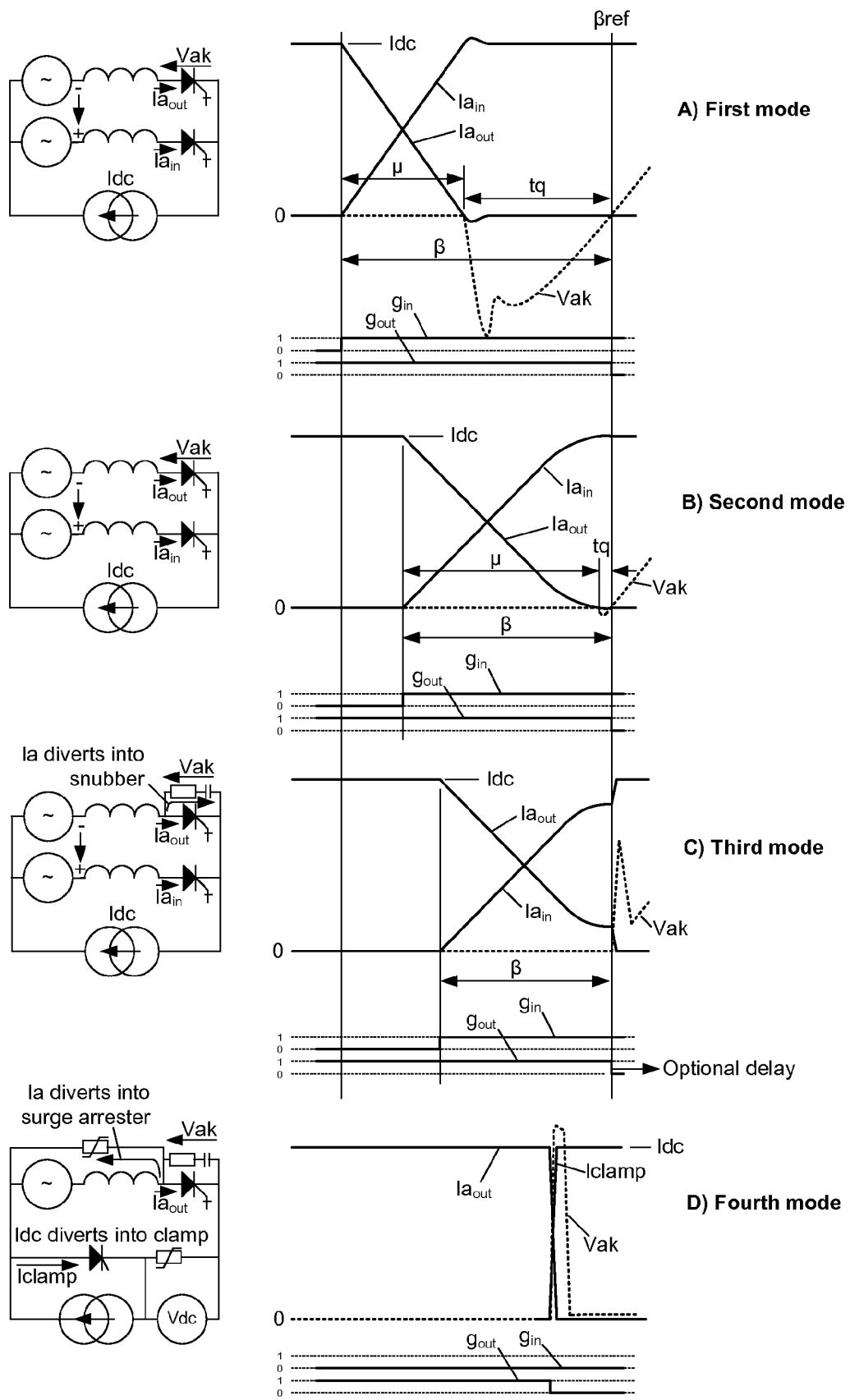
FIG. 3 illustrates the equivalent circuit and waveforms for inverting modes (a) to (d) of a converter according to an embodiment of the present invention.

The four inverting modes (a) to (d) are described in more detail with respect to FIG. 3, which shows a simplified equivalent circuit of the respective inverting commutation mode on the left-hand side and the corresponding waveforms on the right-hand side.

It will be readily appreciated that the waveforms of FIG. 3 are not to scale, but allow comparisons to be made. In each case, the DC link current Idc has the same magnitude. After commutation events in inverting modes (a) to (c) and subsequent transient voltage responses, the waveforms of outgoing device anode-cathode voltage Vak are equivalent to the AC line voltage between incoming and outgoing phases and have the same magnitudes. A reference time is aligned to the zero crossing of the line voltage. The waveforms are all shown with respect to time. However, because the pulse repetition periods are substantially fixed according to the AC grid frequency, which has an equivalent angular frequency, the elapsed times and relative positions of waveform events can be expressed as angles in the frequency domain. In the following description, the time reference is therefore defined in terms of a reference angle βref and the incoming devices are turned on at a point in time that is defined as a firing advance angle β as shown in FIG. 3.

The firing sequences that are applied to the gate drivers of the incoming and outgoing devices are shown as logic signal waveforms $g_{in}$ and $g_{out}$ with logic levels defined as 0=off and 1=on. The logic waveforms $g_{in}$ and $g_{out}$ do not indicate the precise voltage that the gate drivers apply between the gate and cathode terminals of the incoming and outgoing devices, nor do they indicate the precise current that the gate drivers apply to the gate terminals of the incoming and outgoing devices. Yet it will be clear that the gate drivers must have a critical influence upon the behaviour of the devices. Mode (c) and optional mode (d) require that the outgoing devices receive a gate bias that is negative with respect to the cathode at the time of gate commutation and that the gate driver shall be able to extract charge from the gate terminal of the device. More particularly, unity gain turn-off mode may be used and this requires the diversion of anode current from cathode to gate. The gate drivers must, therefore, be designed so as to be capable of causing a gate current that is greater than the level of the anode current $Ia_{out}$ in the outgoing devices to be extracted from the gate terminal at the time of gate commutation. The gate driver, having been so designed, when operating in mode (b), and when instructed to gate commutate the associated outgoing device at the reference time βref, inherently prevents so called "forward recovery failure" of the outgoing device. The skilled person will understand that the outgoing device in a conventional LCC would suffer "forward recovery failure" if the available circuit commutated turn-off time tq is shorter than the recovery time of the device. However, with the appropriate gate drivers, the devices used in the converter of embodiments of the present invention may routinely operate with an available circuit commutated turn-off time tq that is shorter than the recovery time that is applicable with an open circuit gate terminal bias applied.

The devices can optionally be optimised to minimise 'on' state voltage drop as far as is consistent with mode (b) and (c).

The devices can optionally be optimised to minimise 'on' state voltage drop as far as is consistent with modes (b) and (c) and one of: (i) single commutation events according to mode (d), and (ii) a maximum of ten successive commutation events according to mode (d) having a repetition interval that is equal to the period of the associated grid fundamental frequency.

The equivalent circuit for mode (a) is directly equivalent to that of the conventional line commutated converter (LCC) and is included as a reference against which the other modes may be compared. The DC link current Idc flows in an ideal current source whose first terminal is connected to two ideal phase voltages. Each phase voltage source has a corresponding series-connected phase commutating reactance and reverse blocking power semiconductor device (GTO or GCT). The anode of each device is connected to the corresponding commutating reactance, and the cathodes of the devices are connected together and to the second terminal of the ideal current source. The polarity of the AC line voltage (i.e., the difference between the two AC phase voltages) is such that an incoming device will carry anode current $Ia_{in}$ when it is turned 'on' by gate control.

Referring now to the corresponding waveforms for mode (a), an incoming device is turned 'on' by gate control as shown by the 0-1 transition of $g_{in}$ for its associated gate driver (i.e., the gate driver is set to an 'on' state) at a firing advance angle β relative to reference angle βref, thereby initiating a commutation event. It will be readily appreciated that the commutation processes herein described are effectively a sequence of such commutation events according to a suitable control process. The anode current $Ia_{in}$ carried by the incoming device will increase at a rate that is set by the instantaneous sum of the phase voltages divided by the sum of the phase commutating reactances—taking into consideration the mutual and leakage components of these reactances. The anode current $Ia_{out}$ in the outgoing device correspondingly decreases at a rate that is equal and opposite to that of the anode current $Ia_{in}$ in the incoming device. During the time interval defined by the commutation overlap angle μ, the anode current $Ia_{in}$ rises to the value of the DC link current Idc, while the anode current $Ia_{out}$ falls to zero. After the commutation overlap angle μ, the anode-cathode voltage Vak appears as a reverse bias voltage across the outgoing device for a time interval defined by the available circuit commutated turn-off time, which is labelled tq.

Since the incoming device is now in the 'on' state and carries an anode current $Ia_{in}$ equal to the DC link current Idc, the anode-cathode voltage Vak of the outgoing device may be equal to the AC line voltage, but experiences a negative going transient overshoot as a result of the combined action of the di/dt of the reverse recovery of the outgoing device and the damping factor of the commutated circuit upon the voltage that is developed across the commutating reactance. According to best practice, the damping factor of the commutated circuit will be influenced by the presence of switching aid networks (snubbers), which are invariably connected in parallel with reverse blocking power semiconductor devices of the types specified. The available circuit commutated turn-off time tq ends at the point when the anode-cathode voltage Vak reverses and reference angle βref is set at this point in time. At the reference angle βref, the gate driver for the outgoing device is set to the 'off' state, as shown by the 1-0 transition in $g_{out}$, and gate turn-off current is applied to the outgoing device. This has little effect upon the outgoing device because its anode-cathode voltage Vak has been reverse biased for the duration of the available circuit commutated turn-off time tq. It can be seen that tq=β−μ and the outgoing device will reliably continue to block and withstand the applied anode-cathode voltage Vak providing the available circuit commutated turn-off time tq is greater than the recovery time of the outgoing device.

The equivalent circuit for mode (b) is identical to that for mode (a). The waveforms for mode (b) are similar to those for mode (a), and the only change is that the available circuit commutated turn-off time tq approaches zero. The effect of reducing firing advance angle β upon commutated di/dt and μ is exaggerated, and the available circuit commutated turn-off time tq is shown with a small, non-zero value in the interest of clarity. As the limit case of mode (b) (when tq=0, β=μ) is approached, the progressive reduction in commutated di/dt that is a consequence of the sinusoidal nature of the phase voltage sources is to cause the reverse recovery current of the outgoing device to be minimal. Consequently, a small anode-cathode voltage Vak transient is experienced and the corresponding turn-off switching loss is negligible. The magnitude of the voltage transient and corresponding turn-off switching loss reduce, and the power factor increases as firing advance angle β is reduced towards the limit case at which the reverse recovery current of the outgoing device is suppressed, and the power factor of the AC line current is then approximately defined by the cosine of a phase displacement angle equal to μ/2. At the reference angle βref, the gate driver for the outgoing device is set to the 'off' state, as shown by the 1-0 transition in $g_{out}$, and gate turn-off current is applied to the outgoing device. This has a significant effect upon the outgoing device because its anode-cathode voltage Vak has been reverse biased for an available circuit commutated turn-off time tq that is shorter than the recovery time of the outgoing device. Under these conditions, the outgoing device contains significant stored charge which would render it unable to block the forward biased anode-cathode voltage Vak that is applied at the reference angle βref if it were not for applying the gate turn-off current. The exemplary variables depicted in FIG. 4 that apply to the inverting bridge in the 100% power flow left to right condition are for tq=0.63 is and for all practical purposes this is effectively equal to the limit condition of mode (b) where tq=0.

The firing advance angle β of the converter is significantly reduced relative to the limiting case for the conventional LCC whose available circuit commutated turn-off time tq=β−μ must generally be greater than about 1.5 ms in order to achieve safe commutation. The limiting case for mode (b) is where tq=0 or where the firing advance angle β has a limit case of β=μ. This means that the converter can be continuously operated at a greater power factor than a conventional LCC and a smaller power factor correction system can be employed. The converter also produces reduced harmonic forcing voltage so smaller AC- and DC-side harmonic filters are needed. Switching losses in the devices are reduced. It is necessary to recognise that, as the limit case of mode (b) is approached, reductions in the firing advance angle β causes increases in the commutation overlap angle μ and it is generally important that the upper limit of commutating inductance is no greater than is practically necessary.

The equivalent circuit for mode (c) includes a series RC type snubber in parallel with the outgoing device. In practice it might be expected that a suitable snubber will be provided in parallel with each device (or with the anti-parallel connected pair of devices) and they have an influence on the transients in the anode-cathode voltage Vak that arise following gate commutation that occurs in modes (c) and (d).

The corresponding waveforms show mode (c) where conditions equivalent to natural commutation mode (a) or (b) have been initiated by turning 'on' an incoming device at firing advance angle β (i.e., the gate driver for the incoming device is set to the 'on' state as shown by the 0-1 transition of $g_{in}$) and where gate commutation of the outgoing device is initiated at reference angle βref (i.e., the gate driver for the outgoing device is set the 'off' state as shown by the 1-0 transition of $g_{out}$). During the period of the firing advance angle β the waveforms are similar to those shown for modes (a) and (b), i.e., the anode current $Ia_{in}$ carried by the incoming device will increase whilst the anode current $Ia_{out}$ in the outgoing device correspondingly decreases. The commutation overlap angle μ and the available circuit commutated turn-off time tq are not directly relevant to mode (c). The advance firing angle β is normally chosen so that the anode current $Ia_{out}$ in the outgoing device is within acceptable limits at the time when gate commutation is initiated. Gate commutation of the anode current $Ia_{out}$ in the outgoing device causes a positive going transient in the anode-cathode voltage Vak whose magnitude is determined by the component values of the respective snubber, the value of the commutation reactance, the value of the anode current $Ia_{out}$ immediately before gate commutation and the phase open circuit voltage. The magnitude of the anode-cathode voltage Vak during and immediately after gate commutation has a direct bearing on the magnitude of the turn-off switching loss of the outgoing device. Since the magnitude of the commutating reactance is fixed and there is a choice to be made in the timing of the firing commands to turn the devices 'on' and 'off', the critical role of the snubber in defining the transient in the anode-cathode voltage Vak is evident. Phase control of the firing advance angle β is used as the means of controlling the ratio between the DC and AC terminal voltages of the CSC, and this control, therefore, has a bearing upon the turn-off condition of the devices. Since the stated objectives of embodiments of the present invention require the commutation process to generate low power losses in order to maximise efficiency, the timing of the commutation process and the design of the snubber may be optimised and there is some flexibility in the choice of timing of both the advance firing angle β and the point in time of gate commutation. Accordingly, the conditions depicted in FIG. 3 may be altered so as to reduce the advance firing angle β and to initiate gate turn-off of the outgoing device after the reference angle βref as long as the snubber is appropriately designed. When gate turn-off of the outgoing device is initiated after the reference angle βref, the polarity of di/dt in incoming and outgoing devices reverses at the reference angle βref as a consequence of the sinusoidal nature of the phase voltage sources and thereafter, progressively increases causing the anode current $Ia_{out}$ in the outgoing device to correspondingly increase until interrupted at the point in time of gate commutation. In mode (c) the firing advance angle β of the CSC is significantly reduced relative to the limiting case for mode (b) and the available circuit commutated turn-off time tq may be considered to be negative. This means that the CSC can be continuously operated at a greater power factor than the conventional LLC and a smaller power factor correction system may be employed.

The equivalent circuit for mode (d) includes a non-liner resistive surge arrestor in parallel with the outgoing device. The incoming device has been omitted because it is not turned on. The magnitude of anode current that is gate commutated by the outgoing device is particularly high in mode (d) and the non-linear resistive surge arrester has an influence on the transients in the anode-cathode voltages Vak that arise following gate commutation at high values of anode current. When the surge arrester comprises only non-linear resistive elements, these have little or no influence on modes (a), (b) or (c). When the surge arrester comprises linear resistive and capacitive elements, modes (a), (b) and (c) may have an increases in the damping factor and a reduction in the peak magnitude of transients in the anode-cathode voltage Vak arising from commutation, thereby reducing switching losses in the power semiconductor switching devices. But in so doing, they incur dissipation.

The corresponding waveforms show the optional protective mode (d) where the outgoing device is turned 'off' by gate commutation (i.e., the gate driver for the outgoing device is set to the 'off' state as shown by the 1-0 transition of $g_{out}$) and without having previously initiated conditions equivalent to the natural commutation process of modes (a) to (c). The incoming device is not turned 'on' at a firing advance angle β (i.e., the gate driver for the incoming device remains in the 'off' state as shown by $g_{in}$ remaining at 0) and the outgoing device is turned 'off' without its anode current $Ia_{out}$ having been reduced from the initial level of the DC link current Idc prior to gate commutation at the reference angle βref or any other required angle. Whilst it is generally preferable to effect gate commutation at the reference angle βref because the instantaneous value of AC line voltage at that time is zero and because this is beneficial in reducing the positive going transient in the anode-cathode voltage Vak as a result of the increased effectiveness of snubbers and linear RC surge arresters (when used) in damping transient voltages under this condition, the gate commutation may optionally be effected at any required time. For example, in the event of a low impedance AC grid fault which causes DC link current Idc to increase rapidly beyond its rated level, an embodiment may effect gate commutation at the point in time when the DC link current Idc reached the maximum designed protective level. Since the snubber of the outgoing device is preferably optimised on the basis of gate commutation of an anode current $Ia_{out}$ having a magnitude that is much less than the DC link current Idc, the positive going transient in the anode-cathode voltage Vak is often greater than that which could be safely moderated by the snubber alone when the outgoing device is turned 'off'. Although the optional linear resistive capacitive surge arresters have a similar behaviour to the snubber of the outgoing device and are generally beneficial as described above, they are less effective than non-linear surge arresters in limiting peak voltage, particularly when DC link current Idc is increased to fault levels. When the outgoing device turns 'off', its anode current $Ia_{out}$ diverts into the non-linear surge arrester and the transient in the anode-cathode voltage Vak has a truncated top whose peak magnitude is set by the breakover voltage and slope resistance of the non-linear surge arrester. The previously-described snubber and the optional linear resistive capacitive surge arrester is still effective in limiting the rates of increase and decrease of the transient in the anode-cathode voltage Vak. The anode-cathode voltage Vak remains at a low value after the transient because the AC line voltage is low under short circuit fault conditions. Mode (d) is a protective mode and is not intended to be employed in a sustained manner or under normal AC line voltage conditions. As shown in the waveforms, an incoming device is not turned 'on' and the energy that is stored in the DC link reactor must be prevented from causing an additional voltage transient component of the anode-cathode voltage Vak. The preventative means can be provided by a thyristor clamp circuit, which causes the DC link current Idc to divert into the clamp and for this current Iclamp to circulate in the loop comprising the DC link reactor and the clamp. The ideal current source Idc in the equivalent circuit represents the DC link reactance and Vdc is an ideal voltage source that represents the open circuit voltage of the DC link. The DC link will incorporate stray inductance and this is prevented from causing a further additional voltage transient component of the anode-cathode voltage Vak by DC line surge arresters that are connected across Vdc. Optionally, the CSC may be permitted to continue commutating repetitively for a period of time (e.g., 150 ms) until the fault is interrupted by a HVAC circuit breaker. If this optional protective strategy is employed, the incoming device is turned 'on' immediately before the outgoing device is turned 'off', thereby causing the anode current $Ia_{out}$ in the outgoing device to divert into the incoming device rather than into the thyristor clamp circuit, the AC line surge arrester in any case remaining effective. The transient in the anode-cathode voltage Vak has a truncated top whose peak magnitude is set by the breakover voltage and slope resistance of the AC line surge arrester. The waveforms of the optional protective strategy are similar to those of the previously described protection strategy and are not shown; the only difference being that the anode current waveform of the incoming device is approximately the same as that of Iclamp, which it replaces. The thyristor voltage clamp circuit must be retained in order to limit the DC voltage transient that is a consequence of the eventual interruption of AC line current by the HVAC circuit breaker.

The operation of rectifying and inverting modes for highly asymmetric bi-directional power flow are now further explained with reference to FIG. 4, which shows CSCs 2a, 2b with first devices 24 (e.g., GTOs or GCTs) and second devices 26 (e.g., thyristors) connected in anti-parallel.

The upper schematic is annotated with exemplary variables relating to 100% power flow from left to right, e.g., from CSC 2a to CSC 2b, whilst the lower schematic is annotated with exemplary variables relating to 1% power flow from right to left, e.g., from CSC 2b to CSC 2a. In a practical example for a point-to-point HVDC transmission link, CSC 2a might be receiving power from a plurality of offshore wind turbines, where power is supplied along the HVDC transmission link 4 to an AC grid or power network connected to CSC 2b. The HVDC transmission link 4 will normally operate with power flow from left to right. However, in some circumstances, a small amount of power (e.g., 1% of the typical power flow during normal operating conditions) might be provided to the wind turbines such that the direction of power flow is from right to left. As is always the case with a point-to-point HVDC transmission link, the HVDC transmission link voltage may be operated at any desired level that is consistent with the requirement to maintain the required power flow whilst respective HVAC grid voltages are maintained within specified limits. Unusually, the CSC of embodiments of the present invention can achieve the required reversible power flow without recourse to a reversal in HVDC transmission link voltage. It is inevitable that the conductors or cables of the HVDC transmission link experience resistive voltage drop variations that are pro rata with HVDC transmission link current and, although the exemplary HVDC transmission link voltage is subject to a small variation as power flow is reversed, the HVDC transmission link voltage is substantially constant. The exemplary HVDC transmission link current is, therefore, approximately proportional to power flow and has a polarity that corresponds with that of power flow.

In both the upper and lower schematics of FIG. 4, the left-hand HVAC grid voltage has been set at an arbitrary 290 kV and the right-hand HVAC grid voltage has been set at an arbitrary 266 kV.

In the upper schematic of FIG. 4, CSC 2a operates in rectifying mode with the second devices 26 under phase control and first devices 24 continuously gated in the 'off' state. The thyristor firing delay angle $\alpha$ is 7° and the commutation overlap angle $\gamma$ is 22.2°. It would not be practical to operate CSC 2a phased any further forwards and the commutation overlap angle is determined by the presence of full load current and the converter transformer reactance, which in this example is 12%. CSC 2a, therefore, operates at the best possible power factor. In some cases a small leading power factor correction may be applied by other equipment.

CSC 2b operates the first devices 24 under phase control in the naturally commutated inverting mode (b) with zero turn-off (ZTO). The second devices 26 are pulse suppressed, i.e., they do not receive a gate drive current, so that they remain in the 'off' state. The firing advance angle $\beta$ is 28.36° and the commutation overlap angle $\mu$ is 28.34°. It would not be practical to operate CSC 2b phased any further back, and the commutation overlap angle is determined by the presence of full load current and the converter transformer reactance, which in this example is 12%. CSC 2b, therefore, operates at the best possible power factor. In some cases, a small leading power factor correction may be applied by other equipment. CSC 2b operates with an available circuit commutated turn-off time tq of 0.63 µs, which is substantially equal to the ZTO limit case condition.

In the lower schematic of FIG. 4, CSC 2b operates in rectifying mode with the second devices 26 under phase control and first devices 24 continuously gated in the 'off' state. The thyristor firing delay angle $\alpha$ is 10° and the commutation overlap angle $\gamma$ is negligible. It would not be practical to operate CSC 2b phased any further forwards. CSC 2b, therefore, operates at the best possible power factor. There is no significant benefit to be gained from power factor correction since the lagging MVAR drawn from the AC grid is minimal at such a high power factor and a low power.

CSC 2a operates the first devices 24 under phase control in the naturally commutated inverting mode (b) with available circuit commutated turn-off time tq being substantially shorter than the recovery time that is applicable with an open circuit gate terminal bias applied, and the ZTO capability of the first devices 24 is, therefore, exploited. The second devices 26 are pulse suppressed, i.e., they do not receive a gate drive current, so that they remain in the 'off' state. The firing advance angle $\beta$ is 27° and the commutation overlap angle $\mu$ is negligible. It would not be practical to operate CSC 2a phased any further back because the left-hand HVAC grid voltage would deviate from the above arbitrarily determined level of 290 kV. CSC 2a, therefore, operates at the best possible power factor. In some cases, a small leading power factor correction may be applied by other equipment. CSC 2a operates with available circuit commutated turn-off time tq of 1243 µs, which is significantly in excess of the ZTO limit case condition, but is shorter than the required nominal 1500 µs for natural commutation using conventional thyristors.

The exemplary conditions of FIG. 4 include a high degree of asymmetry in current ratings and it would be possible to employ first devices 24 with a relatively small current rating in CSC 2a and second devices 26 with a relatively small current rating in CSC 2b. It would be within the scope of the present invention to operate the first devices 24 of CSC 2b with a reduced value of firing advance angle $\beta$ according to mode (c), i.e., the combined naturally commutated and gate commutated inverting mode, for a power flow direction from left to right, as long as the rated working HVAC grid voltage was adjusted accordingly. CSC 2b would operate at an increased power factor when operating under the circumstances defined by mode (c), but this would be achieved at the expense of increased snubber component ratings and turn-off switching power losses in the first devices 24.

Although it might appear that the increased power factor would be subject to a simple trade off against increased snubber component cost and reduced converter efficiency, it must be recognised that the effect of improving power factor also has a direct bearing upon the volt.amp product of the CSC. In other words, the converter power rating that is achieved for a given HVAC line current and voltage rating is effectively proportional to power factor. This means that the use of mode (c) can be both cost-effective and beneficial in terms of operational flexibility.

FIG. 5 shows a schematic of the six-pulse CSC 2a shown in FIGS. 1 and 4. The bridge 14a includes three AC terminals 16a, 16b, 16c and first and second DC terminals 18a, 18b. The AC terminals 16a, 16b, 16c are connected to an HVAC grid or distribution network by means of a converter transformer 6a.

Non-linear surge arrestors 30 are connected to the AC lines.

The DC terminals 18a, 18b are connected to a respective conductor or cable of the HVDC transmission link 4 by means of HVDC link reactors 12a. A thyristor clamp circuit 32 is in parallel with the HVDC link reactors 12a—see the detailed description of mode (d) above. A surge arrester 72 can be connected across the HVDC transmission link 4 to prevent the stray inductance in the HVDC transmission link from causing an additional voltage transient component in the anode-cathode voltage Vak.

The converter transformer 6a includes grid-side windings 34 connected to the three-phase HVAC grid and converter-side windings 36—both of which are shown more clearly in the detail view. The converter-side windings 36 are effectively a star winding whose points of common coupling have been disconnected to provide three terminals that are connected to a three-phase series mode voltage source active filter (AF) 8a. The series mode active filter 8a may be of any convenient type, for example, two-level, three-level, or multi-level voltage source inverter. When the series mode active filter 8a is controlled so as to produce three-phase zero states (i.e., states where all line voltages are set to zero) the converter-side windings of the converter transformer 6a is effectively star connected with the series mode active filter effectively behaving as a star point. When the CSC 2a operates in any of mode (a) to (c) and the series mode active filter 6a is controlled so as to effectively behave as a star point, the AC terminals of the CSC 2a receive AC voltages that have the same harmonic relationship with the respective DC terminal voltages and with the HVAC grid voltages that is applicable to the conventional LCC. Under these conditions the voltage between the DC terminals 18a, 18b includes a dominant DC component upon which is superimposed a spectrum of harmonic components of order np*Fg whose amplitudes reduce as harmonic order increases, where p is the pulse number (six in this example), n=1, 2, 3 . . . ∞, and Fg is the HVAC grid fundamental frequency. These un-filtered voltage harmonics are undesirable because they cause a corresponding spectrum of harmonic current components to flow in the HVDC transmission link 4 and they may be mitigated to a similar extent to that in the conventional LCC by the use of the DC link reactors 12a. The dominant harmonic component of HVDC transmission link current is that at six times the HVAC grid fundamental frequency. Since the CSC 2a may be designed to operate with a smaller rectifier firing delay angle α or inverter firing advance angle β than in the conventional LCC, its HVDC transmission link current ripple has reduced amplitude. The current ripple can be reduced by increasing the HVDC transmission link reactor inductance and the lowest order harmonic components may be eliminated by increasing the pulse number, for example, a twelve-pulse series CSC (as described below with reference to FIG. 7) has a DC current ripple comprising component of twelve times HVAC grid frequency and multiples thereof, while a twenty-four-pulse series CSC has a DC current ripple comprising components of twenty-four times HVAC grid frequency and multiples thereof. Despite the possibility of using increased HVDC transmission link reactor inductance and converter pulse number, this approach entails an increase in the cost and complexity of wound components and it may be preferable to minimise this current ripple by active means. These active means can be provided by the series mode active filter 6a.

The series mode active filter 6a may be used to superimpose voltages upon the AC line voltages and to effectively superimpose DC ripple voltages upon the voltage between the DC terminals 18a, 18b of the CSC 2a. The effectively superimposed DC ripple voltages may be controlled so as to be in anti-phase with the underlying ripple DC voltage that exists when the series mode active filter 6a acts as a transformer star point. The series mode active filter 6a shown in FIG. 5 has only three terminals and the requirement for symmetry in the three phases of the CSC 2a, therefore, constrain the active filter to have no net power flow into or out of the active filter converter on average, excluding a fractionally small difference, which is required to supply the power losses of the active filter converter. In its most basic form, a particular series mode active filter opposes each positive going peak in the underlying DC ripple voltage and in doing so, the active filter is receiving power from the HVAC grid in the case where the CSC 2a is operating as a rectifier. It follows that the series mode active filter must export power into the HVDC output by opposing each negative going peak in the underlying DC ripple voltage in order to satisfy the above requirement for zero net average power flow into the active filter. In its most basic form the series mode active filter may superimpose one positive going and one negative going rectangular pulse of voltage per cycle of the underlying ripple DC voltage (⅙th of a cycle of HVAC grid fundamental frequency) upon the voltage between the DC terminals 18a, 18b of the CSC 2a. The series mode active filter 6a may optionally superimpose a filtered or un-filtered pulse width modulated or staircase or other multi-level voltage waveform in order to more comprehensively and precisely counteract the effects of DC voltage ripple upon DC current ripple. The use of the series mode active filter 6a allows the inductance, size and cost of the DC link reactors 12a to be reduced for a given permitted DC ripple current content and, moreover, the energy that is stored in the DC link reactors during over-current faults may be minimised.

A shunt mode active filter/compensator 10a may be included, as shown in FIGS. 1 and 5, which is connected in parallel with the CSC 2a and on the grid-side of the converter transformer 6a. The active filter component will mitigate the injection of current harmonics of the fundamental frequency from the CSC 2a into the HVAC grid by superimposing corresponding current harmonics onto the grid connection, which are comparable in magnitude, but in anti-phase to those generated in the CSC and present on the grid-side of the converter transformer 6a. The harmonic numbers h that are compensated by the active filter will depend on the pulse number of the CSC, but can be described in general by h=(np±1), where p is the pulse number (6, 12, 18, 24 etc.) and n=1, 2, 3 . . . y, where y is determined by the grid harmonic injection limitations, which may be specific to the local requirements at the point of connection to the HVAC grid. In instances where the coupling of the CSC 2a to the HVAC grid or distribution network will result in particularly high levels of harmonics injection, optional switched passive harmonic filters may be included to provide additional filtering and reduce the rating requirements of the active filter.

The active filter may comprise any convenient three-phase active filter implementation and will generally include controllable power factor compensation at the point of common coupling with the HVAC grid. Control of the compensator can be accomplished by monitoring the phase displacement between the voltage and injected current at the point of common coupling into the AC grid such that the required level of reactive power may be injected by the compensator to achieve the required power factor. It has been noted that the CSC 2a will reduce the power factor compensation requirements to the benefit of the compensator rating requirements when compared to a conventional LCC. The compensator rating requirements may be further reduced by the inclusion of power factor correction capacitors 38 connected in parallel to the active filter/compensator. These capacitors 38 may be continuously connected to the HVAC grid or may be connected in series with a suitable switching mechanism such that their inclusion and their cumulative reactive power compensation may be controlled.

Power provided to and received from the HVAC grid to the active filter/compensator 10a may be such that on average a balance is achieved and no net power is supplied to the CSC 2a; excluding a fractionally small difference, which is required to supply the active filter/compensator losses. Optionally the CSC 2a may pre-energise the converter transformer 6a, to pre-synchronise to the HVAC grid before AC circuit breaker closure, and to potentially 'black-start' an 'islanded' HVAC grid. In this instance, the commutating voltage required by the CSC 2a may be provided by the active filter/compensator 10a if a suitable energy source is coupled to the DC link of the active filter/compensator. This may include any convenient means of providing reserve power, including through standby generation or by the inclusion of a mechanism of energy storage with sufficient storage capacity to supply energy for the duration required by the specific instance of implementation of the CSC 2a.

The active filter/compensator 10a may be directly coupled to the HVAC grid or optionally coupled to the HVAC grid via an isolating transformer 40, which will provide an additional level of protection to the active filter/compensator during possible fault conditions on the HVAC grid and whose voltage step-up capability would allow for a more convenient lower voltage operation of the active filter/compensator. The active filter 10a can include a pulse width modulated (PWM) filter whose function is to minimise the propagation of active filter switching frequency harmonics into the AC grid. Transformer 40 and power factor correction capacitors 38, if provided, may supplement or replace the PWM filter.

FIG. 6 shows a schematic of the six-pulse CSC 2c shown in FIG. 2. The CSC 2c is similar to CSC 2a, but the bridge 14c includes only first devices 24 (e.g. GTOs or GCTs) and it can operate only as an inverter when first DC terminal 44a is positive with respect to second DC terminal 44b. A person of ordinary skill in the art will appreciate that, if the voltage between DC terminals 44a and 44b are reversed, then a CSC according to an embodiment of the present invention, including only first devices, may optionally operate as a rectifier since GTOs and GCTs are inherently capable of thyristor-like behaviour when provided with appropriate gate drive. The bridge 14c includes three AC terminals 42a, 42b, 42c. The AC terminals 42a, 42b, 42c are connected to an HVAC grid or distribution network by means of a converter transformer 6c.

Non-linear surge arrestors 46 are connected to the AC lines.

The DC terminals 44a, 44b are connected to a respective conductor or cable of the HVDC transmission link 28 by means of HVDC link reactors 12c. A thyristor clamp circuit 48 is in parallel with the HVDC link reactors 12c—see the detailed description of mode (d) above. A surge arrester 72 can be connected across the HVDC transmission link 28 to prevent the stray inductance in the HVDC transmission link from causing an additional voltage transient component in the anode-cathode voltage Vak.

The converter transformer 6c includes grid-side windings connected to the three-phase HVAC grid and converter-side windings. The converter-side windings are as described above for converter transformer 6a and are connected to a three-phase series mode voltage source active filter (AF) 8c. The series mode active filter 8c operates in the same way as the series mode active filter 8a described above.

A shunt mode active filter/compensator 10c is connected in parallel with the CSC 2c on the grid-side of the converter transformer 6c. The active filter/compensator 10c operates in the same way as the active filter/compensator 10a described above. The compensator rating requirements may be further reduced by the inclusion of power factor correction capacitors 50 connected in parallel to the active filter/compensator. The active filter/compensator 10c may be directly coupled to the HVAC grid or optionally coupled to the HVAC grid via an isolating transformer 52. The active filter/compensator 10c can include a PWM filter whose function is to minimise the propagation of active filter switching frequency harmonics into the HVAC grid. Transformer 52 and power factor correction capacitors 50, if provided, may supplement or replace the PWM filter.

FIG. 7 shows a schematic of a twelve pulse CSC 2e with first and second bridges 54, 56. The first bridge 54 includes three AC terminals 58a, 58b, 58c and first and second DC terminals 60a, 60b. The second bridge 56 includes three AC terminals 62a, 62b, 62c and first and second DC terminals 64a, 64b. The ac terminals 58a, 58b, 58c of the first bridge 54 and the AC terminals 62a, 62b, 62c of the second bridge 56 are connected to an HVAC grid or distribution network by means of a converter transformer assembly 64. The first DC terminal 60a of the first bridge 54 defines a first DC terminal of the CSC 2e and is connected to a conductor or cable of the HVDC transmission link 66 by means of a HVDC link reactor 68. The second DC terminal 64b of the second bridge 56 defines a second DC terminal of the CSC 2e and is connected to a conductor or cable of the HVDC transmission link 66 by means of a HVDC link reactor 68. A thyristor clamp circuit 70 is in parallel with each HVDC link reactor 68—see the detailed description of mode (d) above.

The second DC terminal 60b of the first bridge 54 and the first DC terminal 64a of the second bridge 56 are connected together and to ground by means of a grounding resistor 84.

A surge arrester 72 is connected between the first and second DC terminals 60a, 60b of the first bridge 54, and a surge arrester 72 is connected between the first and second DC terminals 64a, 64b of the second bridge 56 in order to prevent the stray inductance in the HVDC transmission link from causing an additional voltage transient component in the anode-cathode voltage Vak. If the protection strategy of CSC 2e is such that mode (d) is effected simultaneously in both the first and second bridges 54, 56, then a single surge arrester may optionally be connected across the HVDC transmission link instead of the two specified surge arresters 72.

Each converter arm includes a first device 24 (e.g., a GTO or GCT) and a second device 26 (e.g., a thyristor) connected in anti-parallel. The CSC 2e is, therefore, capable of operating as both a rectifier and an inverter with bi-directional power flow through the HVDC transmission link 66 without requiring a voltage reversal.

The phase-shifting converter transformer assembly 64 is shown as being two discrete transformers 74a, 74b. Each transformer 74a, 74b includes grid-side windings connected to the three-phase HVAC grid and converter-side windings. A first transformer 74a has a star connected grid-side winding and a star connected converter-side winding whose points of common coupling have been disconnected to provide three terminals that are connected to a first three-phase series mode voltage source active filter (AF) 76a. A second transformer 74b has a delta connected grid-side winding and a star connected converter-side winding whose points of common coupling have been disconnected to provide three terminals that are connected to a second three-phase series mode voltage source active filter 76b. The respective converter-side windings have identical rated voltage magnitudes and impedances relative to the grid-side point of common coupling, but the voltages are subject to a 30° relative phase shift as will be understood by a person of ordinary skill in the art. The first and second series mode active filters 76a, 76b may be of any convenient type, for example, two-level, three-level, or multi-level voltage source inverters. When the first and second series mode active filters 76a, 76b are controlled so as to produce their respective three-phase zero states (i.e., states where all line voltages are set to zero), the respective converter-side windings of each transformer 74a, 74b are effectively star connected with the series mode active filters effectively behaving as star points. When the CSC 2e operates in any of modes (a) to (c) and the first and second series mode active filters 76a, 76b are controlled so as to effectively behave as a star point, the AC terminals of the CSC 2e receive AC voltages that have the same harmonic relationship with the respective DC terminal voltages and with the HVAC grid voltages that are applicable to the conventional LCC. Under these conditions, the voltage between the first and second DC terminals of the CSC 2e includes a dominant DC component upon which is superimposed a spectrum of harmonic components of order np*Fg whose amplitudes reduce as harmonic order increases, where p is the pulse number (twelve in this example), $n=1, 2, 3 \ldots \infty$, and Fg is the HVAC grid fundamental frequency. These un-filtered voltage harmonics are undesirable because they cause a corresponding spectrum of harmonic current components to flow in the HVDC transmission link 66 and they may be mitigated to a similar extent to that in the conventional LCC by the use of the DC link reactors 68. The dominant harmonic component of HVDC transmission link current is that at twelve times the HVAC grid fundamental frequency. Since the CSC 2e may be designed to operate with a smaller rectifier firing delay angle α or inverter firing advance angle β than in the conventional LCC, its HVDC transmission link current ripple has reduced amplitude. The current ripple can be reduced by increasing the HVDC transmission link reactor inductance and the lowest order harmonic components may be eliminated by increasing the pulse number, for example, a twenty-four-pulse series CSC has a DC current ripple comprising components of twenty-four times HVAC grid frequency and multiples thereof. Despite the possibility of using increased HVDC transmission link reactor inductance and converter pulse number, this approach entails an increase in the cost and complexity of wound components and one may minimise this current ripple by active means. These active means can be provided by the first and second series mode active filters 76a, 76b.

The first and second series mode active filters 76a, 76b may be used to superimpose voltages upon the AC line voltages and thereby to effectively superimposing DC ripple voltages upon the voltage between the first and second DC terminals of the CSC 2e. The effectively superimposed DC ripple voltages may be controlled so as to be in anti-phase with the underlying ripple DC voltage that exists when the first and second series mode active filters 76a, 76b act as transformer star points. The series mode active filters 76a, 76b shown in FIG. 7 each have only three terminals and the requirement for symmetry in the three phases of the CSC 2e, therefore, constrain each active filter to have no net power flow into or out of the active filter converter on average, excluding a fractionally small difference, which is required to supply the power losses of the active filter converter. In its most basic form, a particular series mode active filter opposes each positive going peak in the underlying DC ripple voltage of the respective bridge and in doing so that particular active filter is receiving power from the HVAC grid in the case where the CSC 2e is operating as a rectifier. It follows that the same series mode active filter must export power into the HVDC output by opposing each negative going peak in the underlying DC ripple voltage of the respective bridge in order to satisfy the above requirement for zero net average power flow into the active filter. In its most basic form the series mode active filter may superimpose one positive going and one negative going rectangular pulse of voltage per cycle of the underlying ripple DC voltage of the respective bridge (⅙th of a cycle of HVAC grid fundamental frequency) upon the voltage between the DC terminals of the respective bridge of the CSC 2e. The series mode active filter may optionally superimpose a filtered or un-filtered pulse width modulated or staircase or other multi-level voltage waveform in order to more comprehensively and precisely counteract the effects of DC voltage ripple upon current ripple. The harmonic corrective voltages that are developed within first and second series mode active filters 76a, 76b are symmetrically interleaved by defining that they have the same 30° of grid fundamental frequency phase shift that is applied to the phase controlled events of the first and second bridges 54, 56. The use of the series mode active filters 76a, 76b allows the inductance, size and cost of the DC link reactors 68 to be reduced for a given permitted DC ripple current content and, moreover, the energy that is stored in the DC link reactors during over-current faults may be minimised.

Non-linear surge arrestors 78a are connected to the AC lines of the first bridge 54 and non-liner surge arrestors 78b are connected to the AC lines of the second bridge 56.

A common shunt mode active filter/compensator 78 may be included as shown in FIG. 7, which is connected in parallel with the CSC 2e on the grid-side of the converter transformer assembly 64. The active filter component will mitigate the injection of harmonics of the fundamental frequency from the CSC 2e into the HVAC grid by superimposing matching current harmonics onto the grid connection, which are comparable in magnitude, but in anti-phase to those generated in the CSC and present on the grid-side of the converter transformer assembly 64. The harmonic numbers h, which are compensated by the active filter, are in accordance with the pulse number of the CSC, but can be described by $h=(12n\pm1)$, where $n=1, 2, 3 \ldots y$, where y is determined by the grid harmonic injection limitations, which may be specific to the local requirements at the point of connection to the HVAC grid. In instances where the coupling of the CSC 2e to the HVAC grid or distribution network will result in particularly high levels of harmonic injection, it may be beneficial to include optional switched passive harmonic filters to provide additional filtering and reduce the rating requirements of the active filter.

The active filter may be comprised of any convenient three-phase active filter implementation and will generally include controllable power factor compensation at the point of common coupling with the HVAC grid. Control of the compensator can be accomplished by monitoring the phase displacement between the voltage and injected current at the point of common coupling such that the required level of reactive power may be injected by the compensator to achieve the required power factor. It has been noted that the CSC 2e will reduce the power factor compensation requirements to the benefit of the compensator rating requirements as compared to a conventional LCC. The compensator rating requirements may be further reduced by the inclusion of power factor correction capacitors 80 connected in parallel to the active filter/compensator. These capacitors 80 may be continuously connected to the HVAC grid or may be connected in series with a suitable switching mechanism such that their inclusion and their cumulative reactive power compensation may be controlled.

Power provided to and received from the HVAC grid to the active filter/compensator 78 may be such that, on average, a balance is achieved and no net power is supplied to the CSC 2e; excluding a fractionally small difference, which is required to supply the active filter/compensator losses. It has been identified that in some instances, the CSC 2e may pre-energise the converter transformer assembly 64, to pre-synchronise to the HVAC grid before AC circuit breaker closure, and to potentially 'black-start' an 'islanded' HVAC grid. In this instance, the commutating voltage required by the CSC 2e may be provided by the active filter/compensator 78, if a suitable energy source is coupled to the DC link of the active filter/compensator. This may include any convenient means of providing reserve power including through standby generation or by the inclusion of a mechanism of energy storage with sufficient storage capacity to supply energy for the duration required by the specific instance of implementation of the CSC 2e.

The active filter/compensator 78 may be directly coupled to the HVAC grid or optionally coupled to the HVAC grid via an isolating transformer 82, which will provide an additional level of protection to the active filter/compensator during possible fault conditions on the HVAC grid and whose voltage step-up capability would allow for a more convenient lower voltage operation of the active filter/compensator.

The active filter/compensator 78 can include a PWM filter whose function is to minimise the propagation of active filter switching frequency harmonics into the AC grid. Transformer 82 and power factor correction capacitors 80, if provided, may supplement or replace the PWM filter.

What is claimed is:

1. A converter comprising:
    a bridge comprising:
        an AC terminal for each of at least one AC line;
        a first DC terminal and a second DC terminal;
        a first converter arm connected between each respective AC terminal and the first DC terminal; and
        a second converter arm connected between each respective AC terminal and the second DC terminal, each converter arm comprising at least one first power semiconductor switching device configured to be turned 'on' and 'off' by gate control, and have a recovery time,
    wherein the converter is configured to operate in at least one of the following inverting modes:
        (a) a first naturally commutated inverting mode wherein, during each commutation event, an incoming first power semiconductor switching device is turned 'on' by gate control at a point in time in advance of a reference time such that anode current in the incoming first power semiconductor switching device increases at a determined rate and anode current in an outgoing first power semiconductor switching device decreases at a determined rate, the outgoing first power semiconductor device is turned 'off' by gate control at the reference time, and the available circuit commutated turn-off time is greater than the recovery time that is applicable with an open circuit gate terminal bias applied,
        (b) a second naturally commutated inverting mode wherein, during each commutation event, the incoming first power semiconductor switching device is turned 'on' by gate control at a point in time in advance of a reference time such that anode current in the incoming first power semiconductor switching device increases at a determined rate and anode current in the outgoing first power semiconductor switching device decreases at a determined rate, the outgoing first power semiconductor switching device is turned 'off' by gate control at the reference time, and the available circuit commutated turn-off time is shorter than the recovery time that is applicable with an open circuit gate terminal bias applied, the available circuit commutated turn-off time optionally being zero or close to zero, and
        (c) a combined naturally commutated and gate commutated inverting mode wherein, during each commutation event, the incoming first power semiconductor switching device is turned 'on' by gate control at a point in time in advance of a reference time such that anode current in the incoming first power semiconductor switching device increases at a determined rate and anode current in the outgoing first power semiconductor switching device decreases at a determined rate, the outgoing first power semiconductor switching device is turned 'off' by gate control at the reference time or at a point in time that is delayed beyond the reference time, and the available circuit commutated turn-off time is less than zero.

2. The converter according to claim 1, wherein the converter is further configured to operate in the following mode:
    (d) a gate commutated inverting mode wherein, during each commutation event, the outgoing first power semiconductor switching device is turned 'off' by gate control without the incoming first power semiconductor switching device being turned 'on' by gate control.

3. The converter according to claim 1, wherein the converter is further configured to operate in a naturally commutated rectifying mode.

4. The converter according to claim 1, wherein all of the at least one first power semiconductor switching devices are of the same type, optionally gate turn-off thyristors or gate commutated turn-off thyristors.

5. The converter according to claim 1, wherein each converter arm further comprises at least one second power semiconductor switching device configured to be turned 'on' by gate control, optionally a thyristor, and wherein the at least one first and at least one second semiconductor switching devices in each converter arm are connected in anti-parallel.

6. The converter according to claim 5, wherein the at least one second power semiconductor switching device is not turned 'on' by gate control when the converter is operated as an inverter.

7. The converter according to claim 5, wherein the at least one first power semiconductor switching device is maintained in an 'off' state by gate control, and the at least one second power semiconductor switching device is operated in a naturally commutated rectifying mode when the converter is operated as a rectifier.

8. The converter according to claim 1, further comprising a controller configured to control a ratio of DC terminal voltage to AC terminal voltage in response to a phase control signal.

9. The converter according to claim 1, wherein, when the converter is operated in mode (c), during each commutation event, the outgoing first power semiconductor switching device is configured to be turned 'off' by gate control when the anode current in the outgoing first power semiconductor switching device falls below a pre-determined threshold, the pre-determined threshold optionally being a proportion of DC link current.

10. The converter according to claim 1, further comprising at least one surge arrestor connected between the at least one AC line.

11. The converter according to claim 1, further comprising a plurality of switching aid networks, each switching aid network connected in parallel with one of the at least one first power semiconductor switching device.

12. The converter according to claim 1, further comprising a plurality of gate drivers, each gate driver configured to extract gate current from a gate terminal of an associated outgoing first power semiconductor device to turn 'off' the associated outgoing first power semiconductor device by gate control, the extracted gate current is greater than the level of the anode current in the associated outgoing first power semiconductor device at the time of gate commutation.

13. The converter according to claim 1, comprising a plurality of bridges, each of the plurality of bridges comprising:
an AC terminal for each of the at least one AC lines;
a first DC terminal and a second DC terminal;
a first converter arm connected between each respective AC terminal and the first DC terminal; and
a second converter arm connected between each respective AC terminal and the second DC terminal, each converter arm comprising a first power semiconductor switching device configured to be turned 'on' and 'off' by gate control, and have a recovery time,
wherein the DC terminals of the bridges are interconnected in series.

14. An arrangement comprising:
a converter comprising:
a bridge comprising:
an AC terminal for each of at least one AC line;
a first DC terminal and a second DC terminal;
a first converter arm connected between each respective AC terminal and the first DC terminal; and
a second converter arm connected between each respective AC terminal and the second DC terminal, wherein each converter arm comprises at least one first power semiconductor switching device configured to be turned 'on' and 'off' by gate control, and have a recovery time;
an AC grid; and
a DC link,
wherein the converter is configured to operate in at least one of the following inverting modes:
(a) a first naturally commutated inverting mode wherein, during each commutation event, an incoming first power semiconductor switching device is turned 'on' by gate control at a point in time in advance of a reference time such that anode current in the incoming first power semiconductor switching device increases at a determined rate and anode current in an outgoing first power semiconductor switching device decreases at a determined rate, the outgoing first power semiconductor device is turned 'off' by gate control at the reference time, and the available circuit commutated turn-off time is greater than the recovery time that is applicable with an open circuit gate terminal bias applied,
(b) a second naturally commutated inverting mode wherein, during each commutation event, the incoming first power semiconductor switching device is turned 'on' by gate control at a point in time in advance of a reference time such that anode current in the incoming first power semiconductor switching device increases at a determined rate and anode current in the outgoing first power semiconductor switching device decreases at a determined rate, the outgoing first power semiconductor switching device is turned 'off' by gate control at the reference time, and the available circuit commutated turn-off time is shorter than the recovery time that is applicable with an open circuit gate terminal bias applied, the available circuit commutated turn-off time optionally being zero or close to zero, and
(c) a combined naturally commutated and gate commutated inverting mode wherein, during each commutation event, the incoming first power semiconductor switching device is turned 'on' by gate control at a point in time in advance of a reference time such that anode current in the incoming first power semiconductor switching device increases at a determined rate and anode current in the outgoing first power semiconductor switching device decreases at a determined rate, the outgoing first power semiconductor switching device is turned 'off' by gate control at the reference time or at a point in time that is delayed beyond the reference time, and the available circuit commutated turn-off time is less than zero,
wherein the at least one AC line of the converter is connected to the AC grid, and the DC terminals of the converter are connected to the DC link.

15. The arrangement according to claim 14, wherein the at least one AC line is connected to the AC grid by a converter transformer with converter-side windings and AC grid-side windings, the converter-side windings optionally being interconnected at a low voltage end of the converter-side windings by an active filter.

16. The arrangement according to claim 14, further comprising an active filter/compensator connected to the at least one AC lines, optionally by a transformer.

17. The arrangement according to claim 14, wherein the first and the second DC terminals of the converter are connected to the DC link by a passive filter.

18. The arrangement according to claim 17, wherein a clamp circuit is connected in parallel across the passive filter.

19. The arrangement according to claim 14, further comprising at least one surge arrester connected across the DC link.

20. An arrangement comprising:
a plurality of converters, each of the plurality of converters comprising,
a bridge comprising:
an AC terminal for each of at least one AC line;
a first DC terminal and a second DC terminal;
a first converter arm connected between each respective AC terminal and the first DC terminal; and
a second converter arm connected between each respective AC terminal and the second DC terminal, wherein each converter arm comprises at least one first power semiconductor switching device configured to be turned 'on' and 'off' by gate control, and have a recovery time,
wherein the converter is configured to operate in at least one of the following inverting modes:
(a) a first naturally commutated inverting mode wherein, during each commutation event, an incoming first power semiconductor switching device is turned 'on' by gate control at a point in time in advance of a reference time such that anode current in the incoming first power semiconductor switching device increases at a determined rate and anode current in an outgoing first power semiconductor switching device decreases at a determined rate, the outgoing first power semiconductor device is turned 'off' by gate control at the reference time, and the available circuit commutated turn-off time is greater than the recovery time that is applicable with an open circuit gate terminal bias applied, (b) a second naturally commutated inverting mode wherein, during each commutation event, the incoming first power semiconductor switching device is turned 'on' by gate control at a point in time in advance of a reference time such that anode current in the incoming first power semiconductor switching device increases at a determined rate and anode current in the outgoing first power semiconductor switching device decreases at a determined rate, the outgoing first power semiconductor switching device is turned 'off' by gate control at the reference time, and the available circuit commutated turn-off time is shorter than the recovery time that is applicable with an open circuit gate terminal bias applied, the available circuit commutated turn-off time optionally being zero or close to zero, and (c) a combined naturally commutated and gate commutated inverting mode wherein, during each commutation event, the incoming first power semiconductor switching device is turned 'on' by gate control at a point in time in advance of a reference time such that anode current in the incoming first power semiconductor switching device increases at a determined rate and anode current in the outgoing first power semiconductor switching device decreases at a determined rate, the outgoing first power semiconductor switching device is turned 'off' by gate control at the reference time or at a point in time that is delayed beyond the reference time, and the available circuit commutated turn-off time is less than zero, wherein the first and the second DC terminals of the plurality of converters are connected in parallel.

* * * * *